United States Patent [19]

Ulug

[11] 4,375,097
[45] Feb. 22, 1983

[54] TRANSPARENT INTELLIGENT NETWORK FOR DATA AND VOICE

[75] Inventor: Mehmet E. Ulug, Ottawa, Canada

[73] Assignee: Texas Instruments Incorporated, Dallas, Tex.

[21] Appl. No.: 150,265

[22] Filed: May 15, 1980

Related U.S. Application Data

[63] Continuation of Ser. No. 912,114, Jun. 2, 1978, abandoned.

[51] Int. Cl.³ .............................................. H04J 6/00
[52] U.S. Cl. ...................................................... 370/94
[58] Field of Search ............... 370/93, 80, 84, 88, 370/89, 99, 60, 61, 83, 94, 92, 91, 100, 112, 43, 81, 16

[56] References Cited

U.S. PATENT DOCUMENTS

| | | | |
|---|---|---|---|
| 3,303,475 | 2/1967 | Hellerman | 370/91 |
| 3,387,086 | 6/1968 | Beresin | 370/43 |
| 3,641,273 | 2/1972 | Herold | 370/80 |
| 3,721,767 | 3/1973 | La Marche | 370/81 |
| 3,749,845 | 7/1973 | Fraser | 370/80 |
| 3,829,777 | 8/1974 | Muratani | 370/16 |
| 3,927,268 | 12/1975 | Sciulli | 370/80 |
| 3,934,224 | 1/1976 | Dulaney . | |
| 3,988,545 | 10/1976 | Kuemmerle | 370/60 |
| 4,009,345 | 2/1977 | Flemming | 370/93 |
| 4,074,232 | 2/1978 | Otomo | 370/60 |
| 4,093,823 | 6/1978 | Chu | 370/80 |
| 4,096,355 | 6/1978 | Rothauser | 370/93 |

Primary Examiner—Thomas A. Robinson
Attorney, Agent, or Firm—Thomas G. Devine; Rhys Merrett; Mel Sharp

[57] ABSTRACT

A transparent intelligent communication network having nodes and communication links between the nodes and providing improved system input features by including the sampling of customer inputs at different rates according to their output rates of data at the exit node or at faster rates if there is a spare channel capacity available.

14 Claims, 20 Drawing Figures

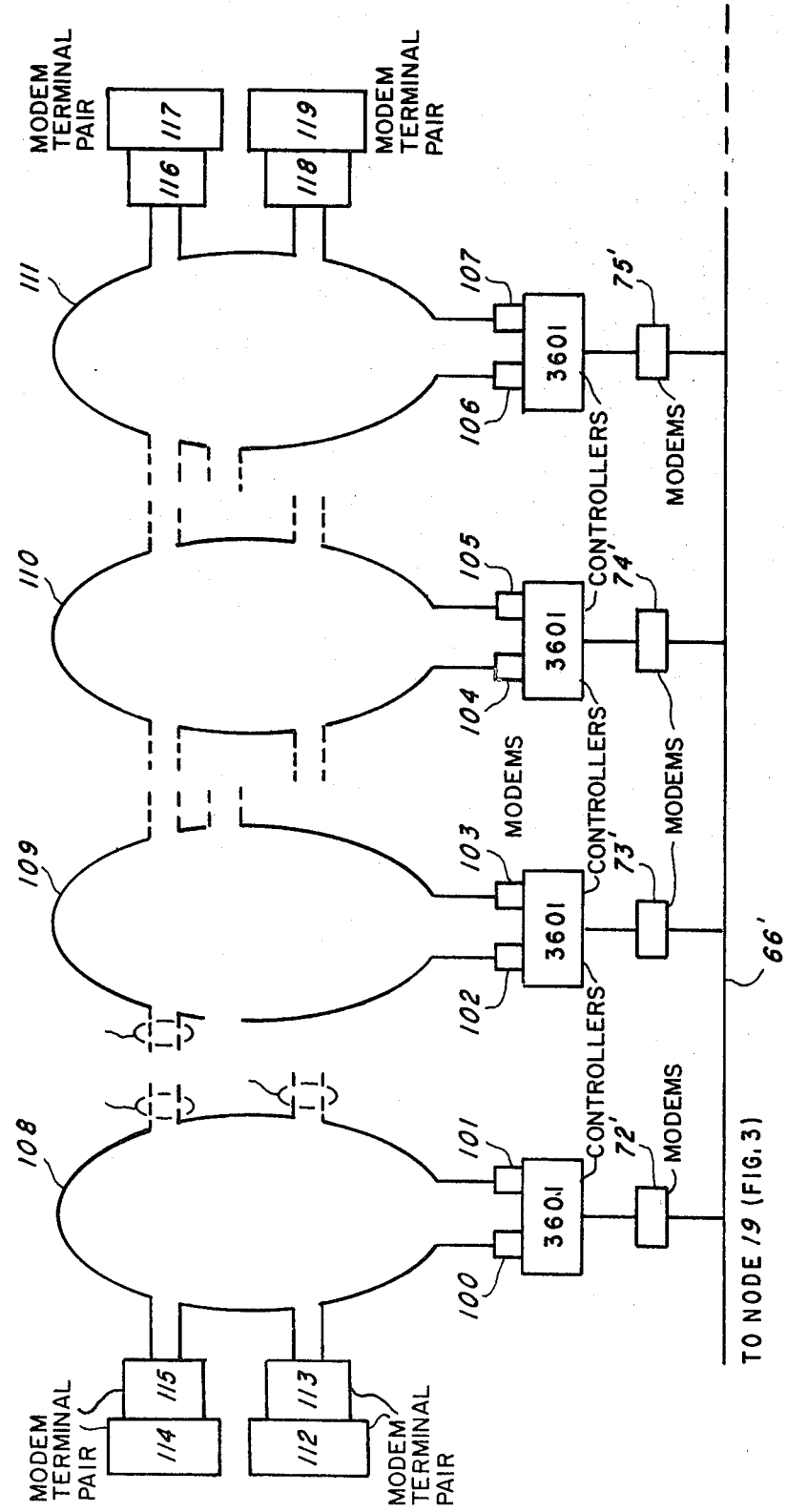

SYNCHRONOUS MINI-PACKET

ASYCHRONOUS MINI-PACKET
H = HEADER
H = 0, MUP HAS NO DATA SECTION
H = 1, MUP HAS A DATA SECTION
CC = CHARACTER COUNT, 2 BITS
I.E., UP TO 4 CHARACTERS
IN DATA SECTION

MULTI-USER PACKET

1st ADDRESS — 2nd ADDRESS
HEADER FOR SYNCHRONOUS MULTI-USER PACKET

Fig. 11
HEADER FOR SYNCHRONOUS MULTI-USER PACKET
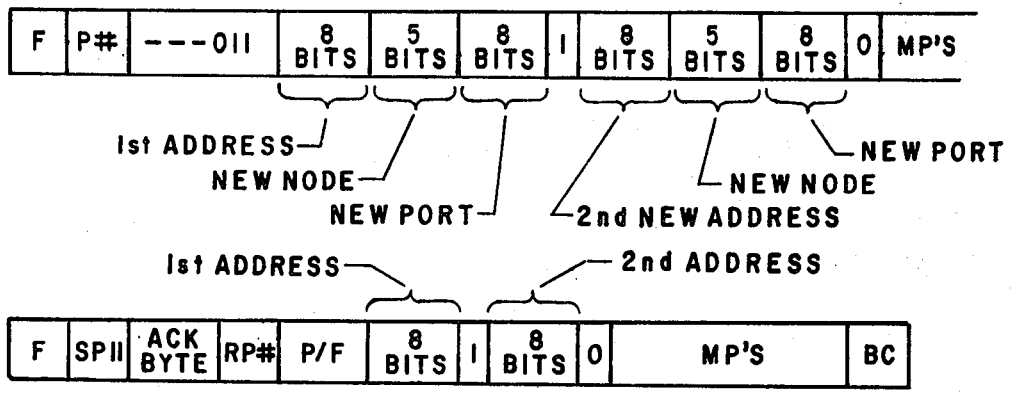
ASYNCHRONOUS MULTI-USER PACKET
Fig. 12
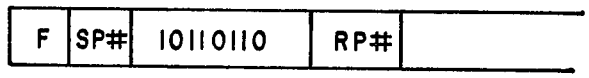
PART OF FIG. 12
Fig. 13
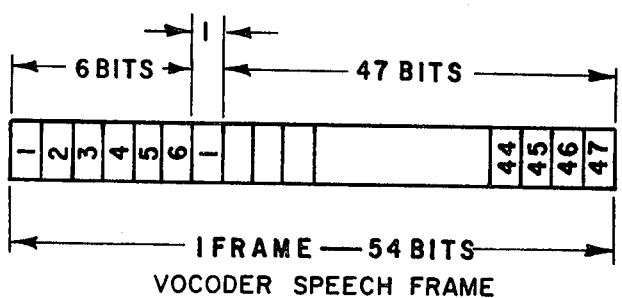
VOCODER SPEECH FRAME
Fig. 18
Fig. 20
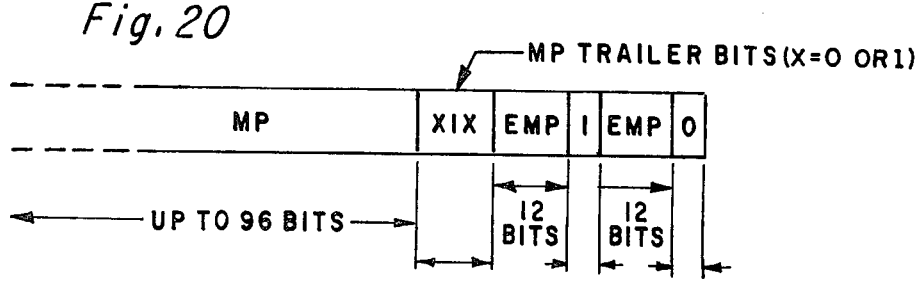
EXTENSION MINIPACKET ALGORITHM

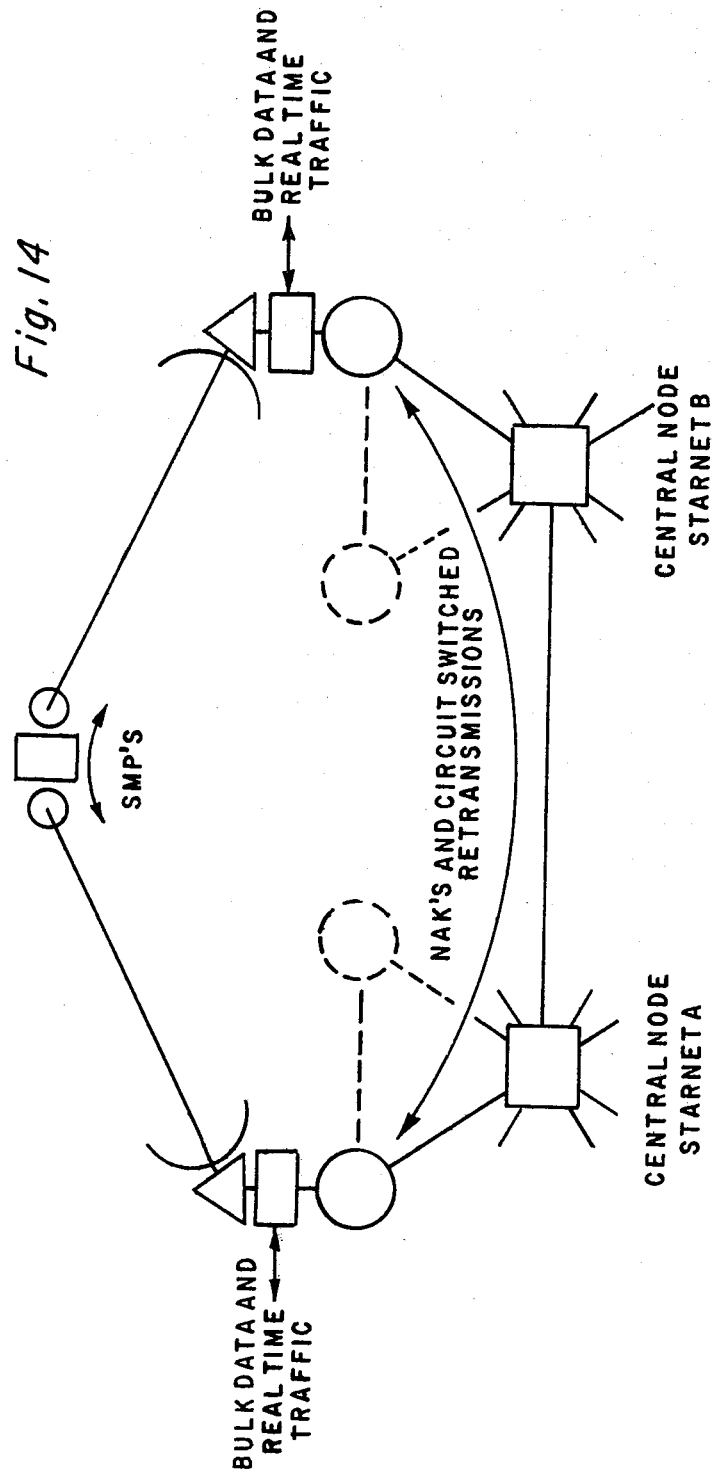

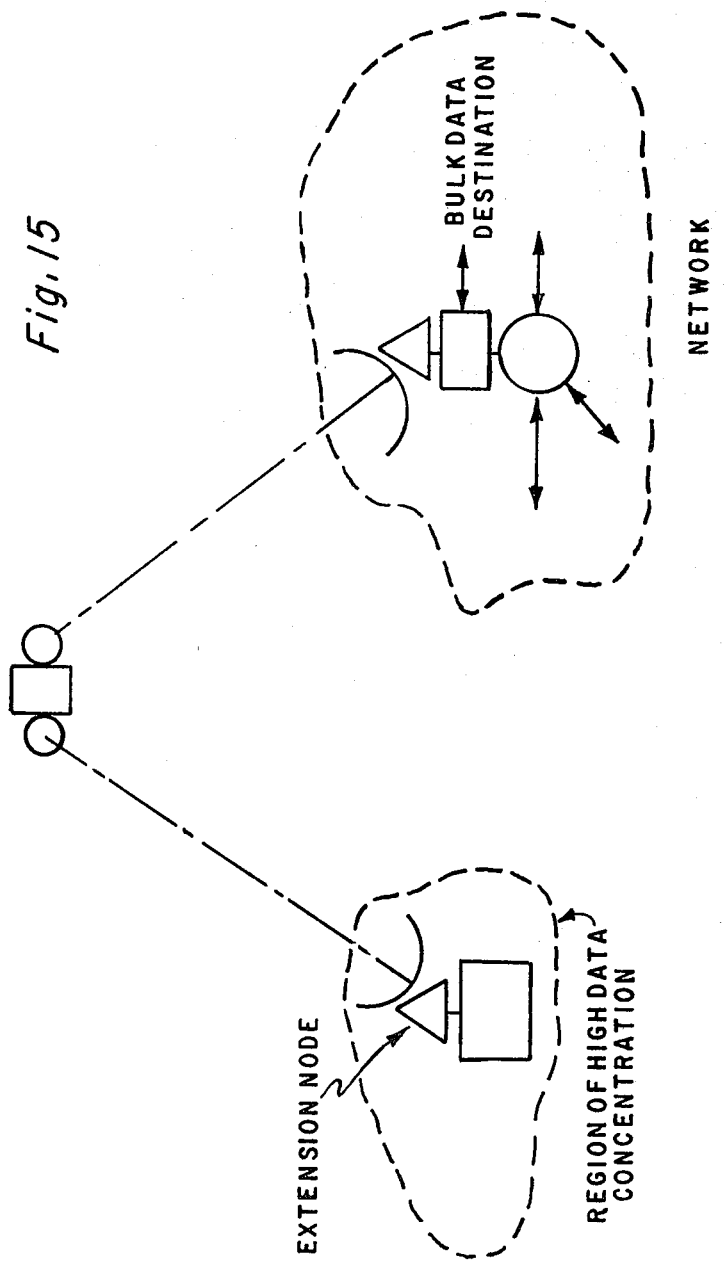

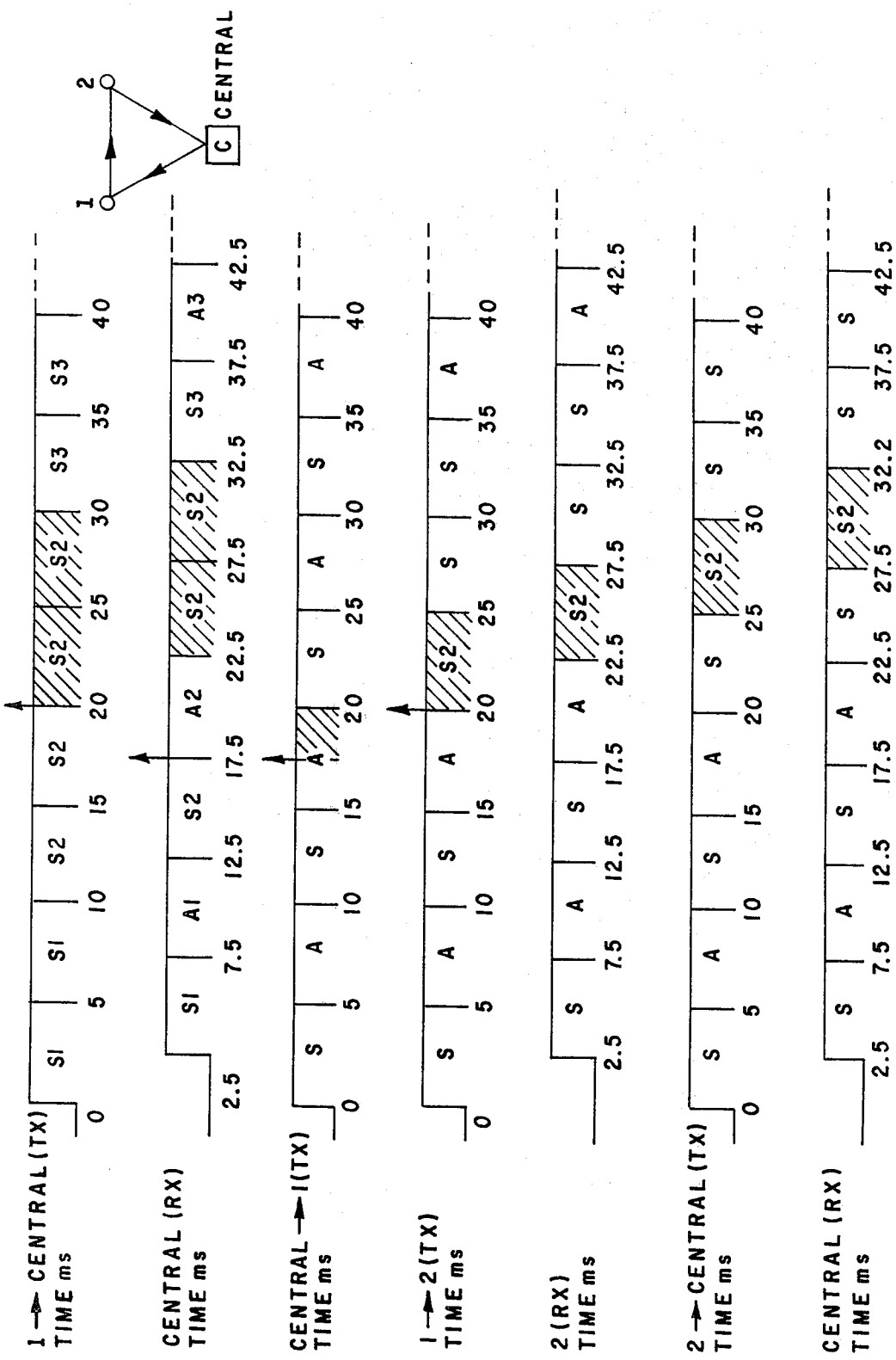

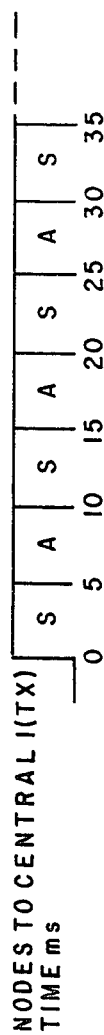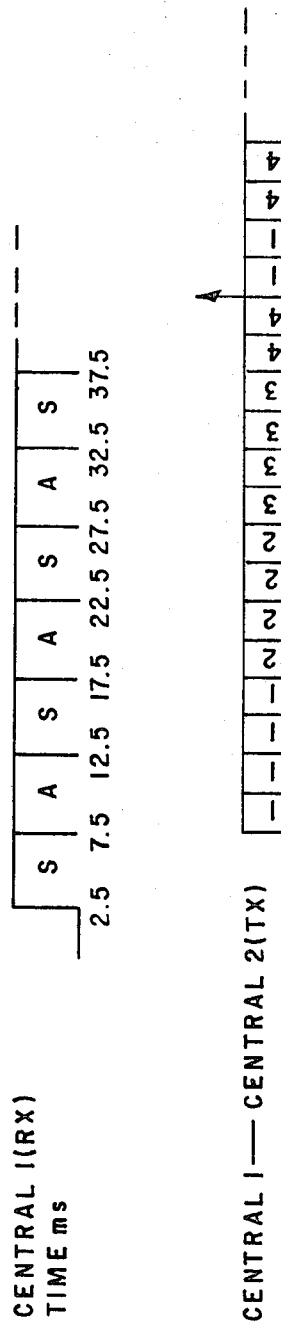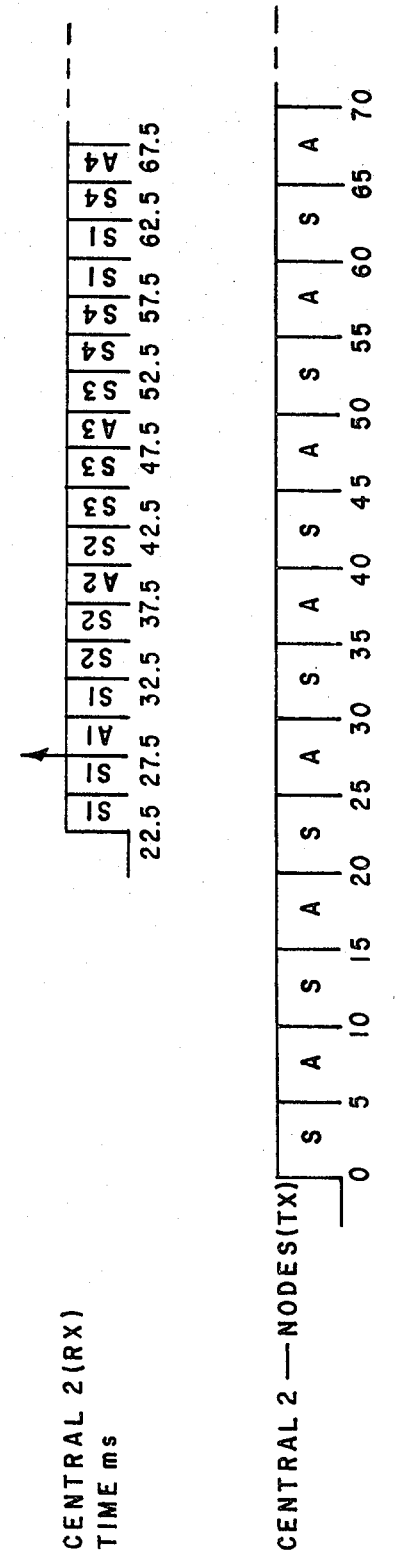
Fig. 17

TRANSPARENT INTELLIGENT NETWORK FOR DATA AND VOICE

This is a continuation of application Ser. No. 912,114 filed June 2, 1978 now abandoned.

This invention relates to communications systems and more particularly to communications systems providing for the digital transmission of voice and data.

Communications systems of the foregoing type have heretofore been proposed, illustrative of which is that described in U.S. Pat. No. 3,749,845 granted to Alexander G. Fraser on July 31, 1973 and entitled "Digital Data Communication System". Other representative examples are those in which messages are switched through predetermined paths from origin to destination. In such networks, messages may be accumulated at the point of entry into the system and then transmitted in a store and forward mode wholly or partially over the predetermined path either solely or in asynchronous time shared multiplex with other messages.

Another system of the prior art is represented by packet switched networks in which asymmetrical data is encoded into small packets which are then sent through the system over a number of different paths at the same time in a store and forward mode.

Still another system of the prior art involves generation of composite packets carrying asynchronous data which are transmitted over circuit switched paths.

As will be recognized by those skilled in the art, circuit switching contemplates a circuit which conducts communications between a given terminal at one end of the system and another pre-identified terminal at the other end.

While the foregoing systems have constituted substantial advances in the communications art, they nevertheless continue to be characterized by certain disadvantages. Among these are excessive fixed and variable delays, lack of a global flow control scheme to avoid congestion within the network, limited utilization of available communications channel capacity, out of sequence or lost packets, dependence upon user protocol, limited error correction capability particularly on synchronous data transmitted over circuit switched paths, inability to transmit encoded voice, intelligibly, and difficulty of using integrated terrestrial and satellite links with "roof top" antennas.

Accordingly, efforts have continued to develop improved communications networks which are free of the foregoing disadvantages.

It is one general object of this invention to improve network communications having bulk data and real time traffic with permanent circuit and switched circuit mode operation.

It is another object of this invention to simplify interconnections with external equipment, that is, for example either by providing transparency in protocol or by interfacing with X-25 international standard network access protocol.

It is another object of this invention to minimize delays in a subscriber achieving connection to the communications system, such being normally referred to as admission delays, for example by eliminating the use of network interface machines which are necessary when non-programmable terminals enter the system to communicate with a computer programmed to use X-25 international standard.

It is another object of this invention to eliminate or minimize internal delays within the network, that is, to eliminate or substantially minimize the steady state synchronous queues in all nodes.

It is another object of this invention to maximize utilization of internal system channel capacity, or bandwidth.

It is another object of this invention to provide such rapid transit through the system that it appears to be transparent in time; for example, by servicing the incoming lines at rapid and regular intervals and by trading off the satellite up-down delay with the packet formation delay experienced in the prior art.

It is another object of this invention to provide in a time transparent communications network, error correction which results in highly accurate transmission; for example, by transferring queued portions of the incoming messages from the entrance to exit nodes at higher speeds than the outgoing line speed.

It is another object of this invention to improve effective utilization of equipment, particularly storage capacity of the entrance nodes, thereby reducing costs.

It is yet another object of this invention to improve flexibility by providing a system which is not dependent upon user protocol or software; for example, by allowing the polling and addressing of terminals without using emulation techniques in computers using X-25 international standard protocol.

It is yet one final object of the invention to provide all of the foregoing advantages in a general purpose public and/or private network for data and encoded as well as scrambled voice, thereby reducing the cost and increasing security of long distance telephone calls.

Accordingly, in accordance with one feature of the invention, system architecture is characterized by being of the 2-level hierarchial type, as for example, by a plurality of near neighbour connected star nets each having a central node, and wherein said central nodes are each directly connected to each other via 12–14 GHz satellite channels as well as terrestrial links which carry mostly protocol messages and re-transmissions for the purposes of error correction, although some part or all of the real time traffic can also be sent over the terrestrial links, thereby providing no more than three transmission hops between point of entry and destination, and contributing to speed and accuracy of transmission.

In accordance with another feature of the invention, a unique entry arrangement is provided whereby priority is first accorded voice transmission and where remaining synchronous traffic is served on a selective first in-first out basis, thus contributing to reduction in admission delays, as well as improved transmission efficiency.

In accordance with still another feature of the invention, voice and other synchronous traffic is accorded priority over asynchronous traffic, thereby further contributing to efficiency and effectiveness of the network.

In accordance with yet another feature of the invention, when servicing computers using X-25 standard, packets which arrive in batch form over high speed lines at the system are repetitively sampled at extremely brief intervals and transmitted using idle servers and extension mini-packets, thus contributing to the aforementioned reduction in admission delays.

In accordance with yet another feature of the invention, information in the form of mini-packets is rapidly extracted from input buffers to limit the buildup of incoming information (which is normally stored until a complete message or packet is received in the prior art), and such mini-packets are grouped in multi-user packets at very brief intervals and high repetition rates, thus resulting in a parallel type of transmission which further reduces internal delays and minimizes queues.

In accordance with yet another feature of the invention, the multi-user packets are transmitted rapidly from one node to another where the multi-user packets are disassembled and reassembled into other multi-user packets for immediate progressive dispatch through succeeding portions of the network.

In accordance with still another feature of the invention through the advantageous selection of multi-user packets contents, block checking may be advantageously employed and multi-user packets which are received with erroneous information are promptly retransmitted, thereby markedly enhancing reliability and accuracy of transmission.

In accordance with still another feature of the invention, circuitry is advantageously provided which recognizes when channel capacity is about to be under-utilized and, consequently, allocates available channel capacity to increase the effective rate with which other messages are transmitted through the system, thus not only contributing to reduction of transmission time through the network but, additionally, increasing the speed with which other traffic can obtain admission to the system.

In accordance with yet another feature of the invention, where traffic such as encoded voice is being entered into the system, "reservations" are automatically made for the subsequent channels within the system so as to provide continuing priority and rapidity of transmission in order that end-to-end message delay variance may be avoided.

In accordance with still one further feature of the invention, provisions are made for integrated terrestrial and satellite communications links between nodes, thereby providing not only increased flexibility and reliability for real time traffic but in addition, capacity for economic transmission of bulk data by the use of 12-14 GHz satellite channels using "roof top" antennas.

These and other objects and features of the invention will be evident from the following detailed description by way of example, with reference to the drawing in which:

FIG. 3a depicts in greater detail, a portion of FIG. 3;

FIG. 11 depicts another typical header portion of a synchronous multi-user packet illustrating a mode for changing receive nodes and ports for the purpose of operating in circuit switched mode;

FIG. 12 depicts a typical header portion of an asynchronous multi-user packet;

FIG. 13 is a portion of FIG. 12 in greater detail;

FIG. 14 is a diagram depicting the interrelationships of the satellite and terrestrial links;

FIG. 15 is a diagram displaying the interrelationships of a satellite extension node and elements of the network;

FIGS. 16 and 17 are timing diagrams which show time relationships between star and central nodes.

FIG. 18 is a diagramatic representation of the contents of representative speech frames employed by the VADAC-5 vocoders.

FIG. 20 depicts how the instantaneous bandwidth expansion is implemented by joining a mini-packet to a number of extension mini-packets.

Figure 1:
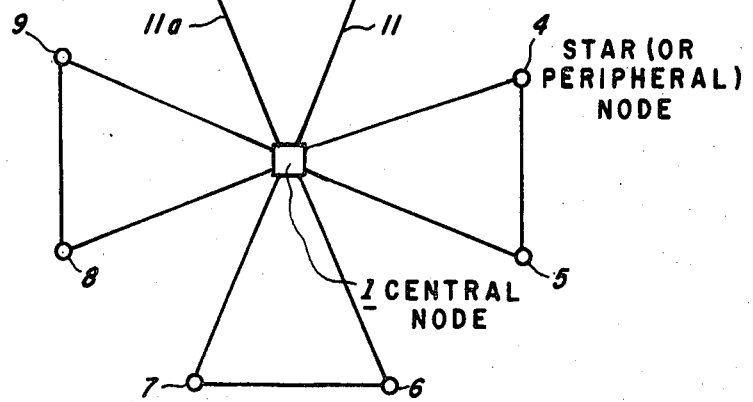
FIG. 1 depicts a single star node representing a first level of system hierarchy.

Now referring to FIG. 1, it will be observed that there is therein depicted a central node 1 and a plurality of peripheral (star) nodes 2-9. Each of these peripheral nodes e.g., 2, is connected to one other peripheral (near neighbour) node e.g., 3, via communication paths 10 and to central node 1 over communication paths 11, thus providing an alternate transmission path in the event of failure of the principal path 11a. For example, peripheral node 2 may communicate with central node 1 not only via its direct communication link 11a, but additionally, via link 10 to star node 3 and thence through link 11 connecting star node 3 to central node 1. In such cases, MUP's are switched through node 3 unchanged. A "near neighbour" of a peripheral node is another peripheral node (not including a central node) that is connected via a one hop communication path.

Those skilled in the art may be accustomed to the use of capitol letters "MP" for the expression multi-user packet and lower case letters "mp" for the expression mini-packet. However in this description the abbreviation MUP is used for multi-user packet in order to distinguish more particularly from the abbreviation MP which is employed for mini-packets.

Figure 2:
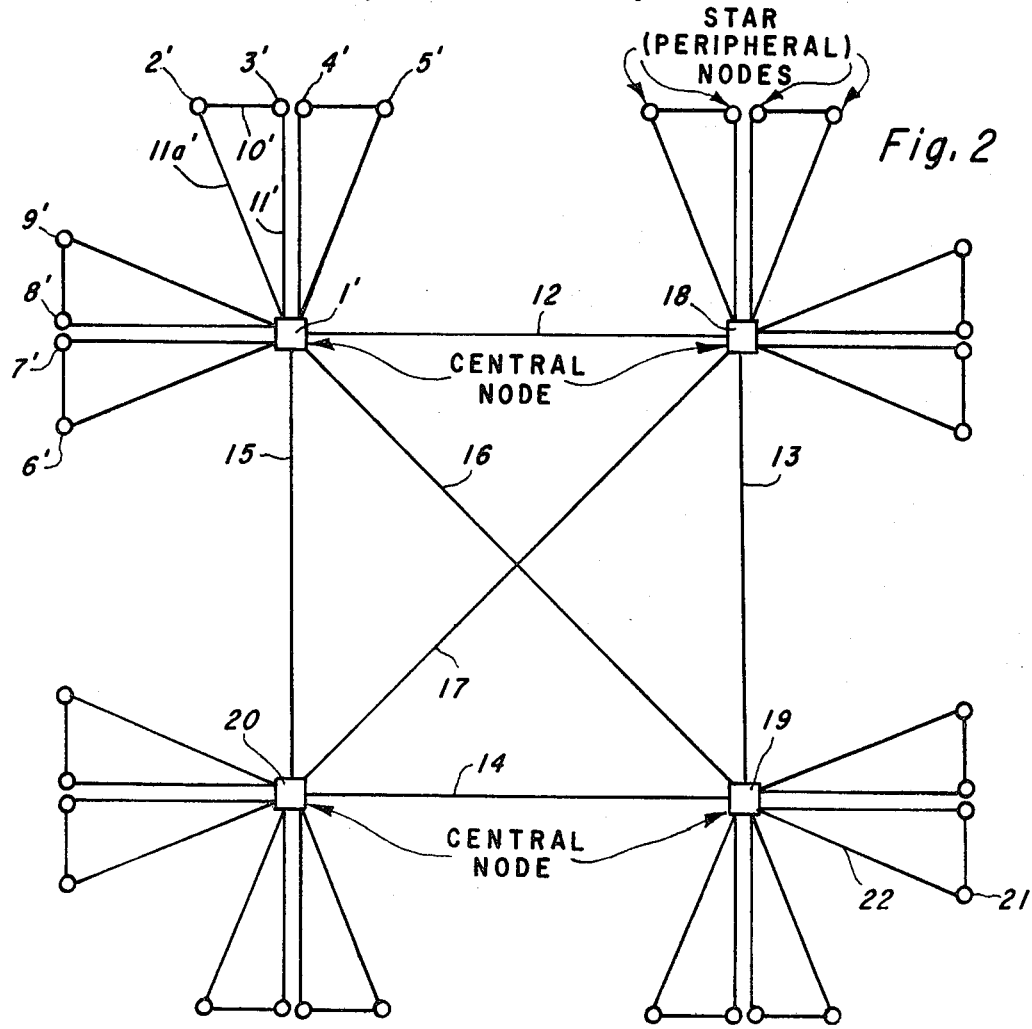
FIG. 2 depicts a plurality of interconnected star nodes representing the second level of system hierarchy.

Now referring to FIG. 2, it will be observed that there are depicted four central nodes 1', 18, 19 and 20 which themselves are fully connected via direct data links 12-17. These data links consist firstly of 12-14 GHz satellite channels and secondly low capacity fully connected terrestrial trunks. The significance of these interconnections will become evident in connection with the following detailed description of the system operation. It will also be observed that the star nodes correspond to those of FIG. 1 and one of them is identified with similar symbols for ease of comparison.

In referring to FIG. 2, it will be observed that any node is connectable to any other node through no more than three serial interconnecting paths. The central nodes are, of course, connected to each other with only one such path, i.e., paths 12-17. The peripheral (star) nodes, on the other hand, are interconnectable through either one, two or three links, depending upon their physical locations and connections to the central nodes. Thus, for example, peripheral (star) node 2' is connectable to node 3' either via the normal path consisting of 11a', node 1 and 11', or in case of emergency, directly over path 10'.

Peripheral nodes connected to different central nodes are connectable via 3 links. Thus, node 2' is connectable to node 21 via link 11a', link 16, and link 22. Further reference to FIG. 2 will demonstrate that in the absence of link malfunction any node is connectable to any other node through no more than three communications links. This is a significant feature of system architecture, for by limiting the possible number of links in transmission paths, it is possible to simplify internal communication and to prevent significant delays in both entry to the system and communication therethrough. In this connection, it is helpful to have in mind that when user information is transmitted through the system, the mini-packets maintain their integrity throughout the system. However, they are assembled into different multi-user packets at each subsequent node so that where three hops are involved, a mini-packet is included in three different multi-user packets, multi-user packets having a life-time of only one hop.

Figure 3:
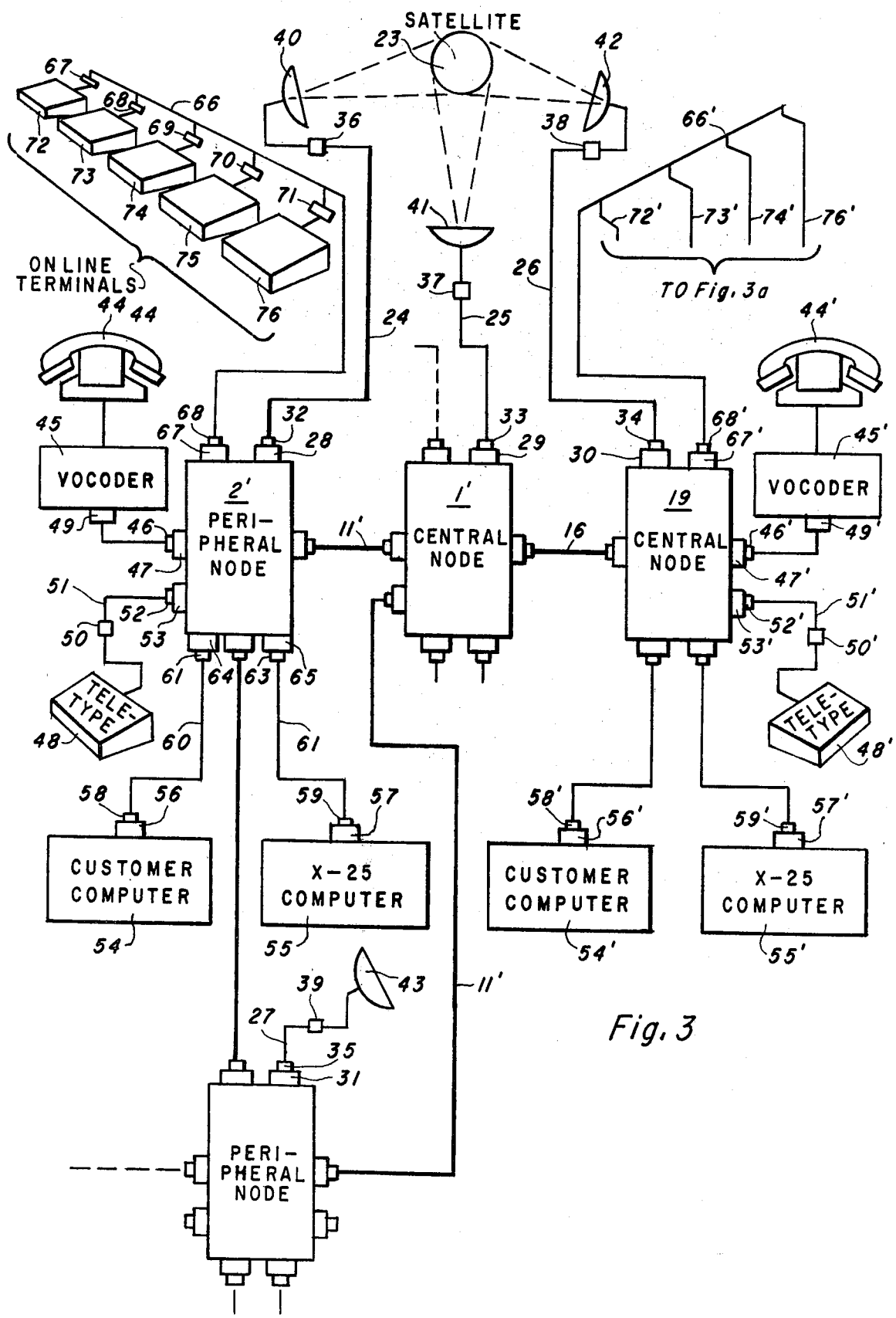
FIG. 3 is a diagram depicting representative elements of a typical fully interconnected system in accordance with the inventions.

Now referring to FIG. 3, it will be observed that there is therein depicted a pair of peripheral nodes 2' and 3' which correspond to like peripheral nodes in FIG. 2. Also depicted are central nodes 1', and 19 again corresponding to like nodes in FIG. 2. Nodes 2' are 3' are connected to central node 1' via data link 11'. They are also interconnected via satellite 23 and communications paths 24-27, synchronous line adaptors 28-31, modems 32-35, transmitter/receiver units 36-39 operating in TDMA (time division multiple access) mode, and microwave antennas (2-3 meter dishes) 40-43.

Each of the nodes, both peripheral and central, are adapted for connection to lines conducting thereto and therefrom synchronous signals representative of voice and other data, together with asynchronous signals of various kinds. Examples of such are depicted in FIG. 3 wherein voice signals developed by telephone 44 are connected to vocoder 45 where digital signals representative of voice are produced and introduced through modem 49 to the local loop and then via the modem 46 into the synchronous line adaptor 47 to peripheral node 2'. Similarly, asynchronous signals are generated by teletype console 48 and connected to asynchronous line adaptor 49a (not shown) and modem 50 before being transmitted over the local loop 51 and thence through incoming modem 52 and asynchronous line adaptor 53 to peripheral node 2'.

Other synchronous data is input from sources such as, for example, a customer computer 54 or X-25 computer 55 through the front ends 56 and 57 and modems 58 and 59 via terrestrial links 60 and 61 and thence through modems 62 and 63 and line adaptors 64 and 65 to peripheral node 2'.

It may be helpful in understanding FIG. 3 to be aware that the aforedescribed connections to peripheral node 2' are bidirectional. That is, not only is data input to node 2' via the above described paths, but reverse data is communicated in the opposite direction therefrom.

Further referring to FIG. 3, provision is shown for connecting to node 2' a polled line 66 through asynchronous line adaptor 67 and modem 68. Branching off from line 66 is a plurality of individual asynchronous terminals 67-71 which, for example, may be 1200 baud on-line banking terminals or 300 baud point of sale terminals in retail stores.

FIG. 3a depicts line 66' and its attached equipment in greater detail. Connected to line 66' are a plurality of on-line banking controllers (e.g. IBM 3601) or the like, connected in full duplex multi-drop multi-point configuration. As will be recognized by those skilled in the art, 72'-75' are modems. These are, in turn, individually connected to the associated modems 100-107. Modems 100-107 are also connected, as shown, to a number STDM (synchronous time division multiplexing) local or remote simplex loops 108-111 to which there are also connected pluralities of synchronous modem-terminal pairs such as 112/113, 114/115, 116/117 and 118/119. Other terminals (not shown) may be included and are represented by the dashed lines such as 120-122.

Further, in connection with FIG. 3a, it will be recognized that while one loop only is depicted as being associated with each 3601, many other loops may be advantageously connected thereto. For purposes of clarity in the drawing only one such loop is shown. However, it is contemplated that for terminals within the same building that houses the 3601, there may be a simple simplex digital loop; whereas for remote terminals there may be one or more additional loops in synchronous time division multiplexing mode, each suitably connected to a set of modems.

Further reference to FIG. 3 reveals that connected to node 19 are equipments similar to those connected to node 2'.

However, such is shown for the purpose of illustration and convenience only since each node may have different combinations of equipments connected to it.

It will be evident to one skilled in the art that the various communications links shown in FIG. 3 are adaptable to the type and speed required for handling the traffic. Thus, for example, links 11a' and 16 will be high speed terrestrial links. (In the drawing, high speed links are depicted by thicker lines.) The links via satellite 23 similarly will be high speed. Links 60 and 61 which connect computers 54 and 55 into the system may either be a large number of low speed lines or a lesser number of higher speed lines in order to transmit the required quantities of data into the system. In this connection, as will be more fully developed below, it will be evident to those skilled in the art that certain types of computers have the capability for development and transmission of large quantities of data in very short periods of time. Accordingly, very large quantities of data may be transmitted over links such as those identified by symbols 60 and 61 and arrive in star node 2' in batch form, and it is one of the attractive features of this network that it is adaptable for receiving and processing such batch data with a high degree of rapidity.

Equipment which has been found suitable for use in the herein described system includes VADAC-5 vocoders manufactured by E Systems Corporation of Garland, Tex., U.S., standard Bell Telephone System modems, DUP 11 and DU 11 line adaptors manufactured by Digital Equipment Corporation of Maynard, Mass., U.S. and for the nodes themselves, PDP 11-45 and PDP 11-40 mini-computers also manufactured by Digital Equipment Corporation. Although these equipments are suitable for employment in the system, it will be evident that many others similarly may be used. Thus, for example, any suitable linear predictive encoder may be employed for voice encoding, modems such as those commercially available from the International Business Machines Corporation (IBM) may be used with other IBM equipment, and a variety of minicomputers or microprocessor systems may be employed.

Although the foregoing equipment has been used in networks as herein described in connection with FIGS. 3 and 3a, reference to FIGS. 4 and 5 may be helpful to a more complete understanding of its operation. As will be observed from reference to FIGS. 4 and 5, functional diagrams are therein depicted in which the interrelationships of the various functioning elements of one of the peripheral (star) nodes are shown schematically in block diagram form.

Figure 4:
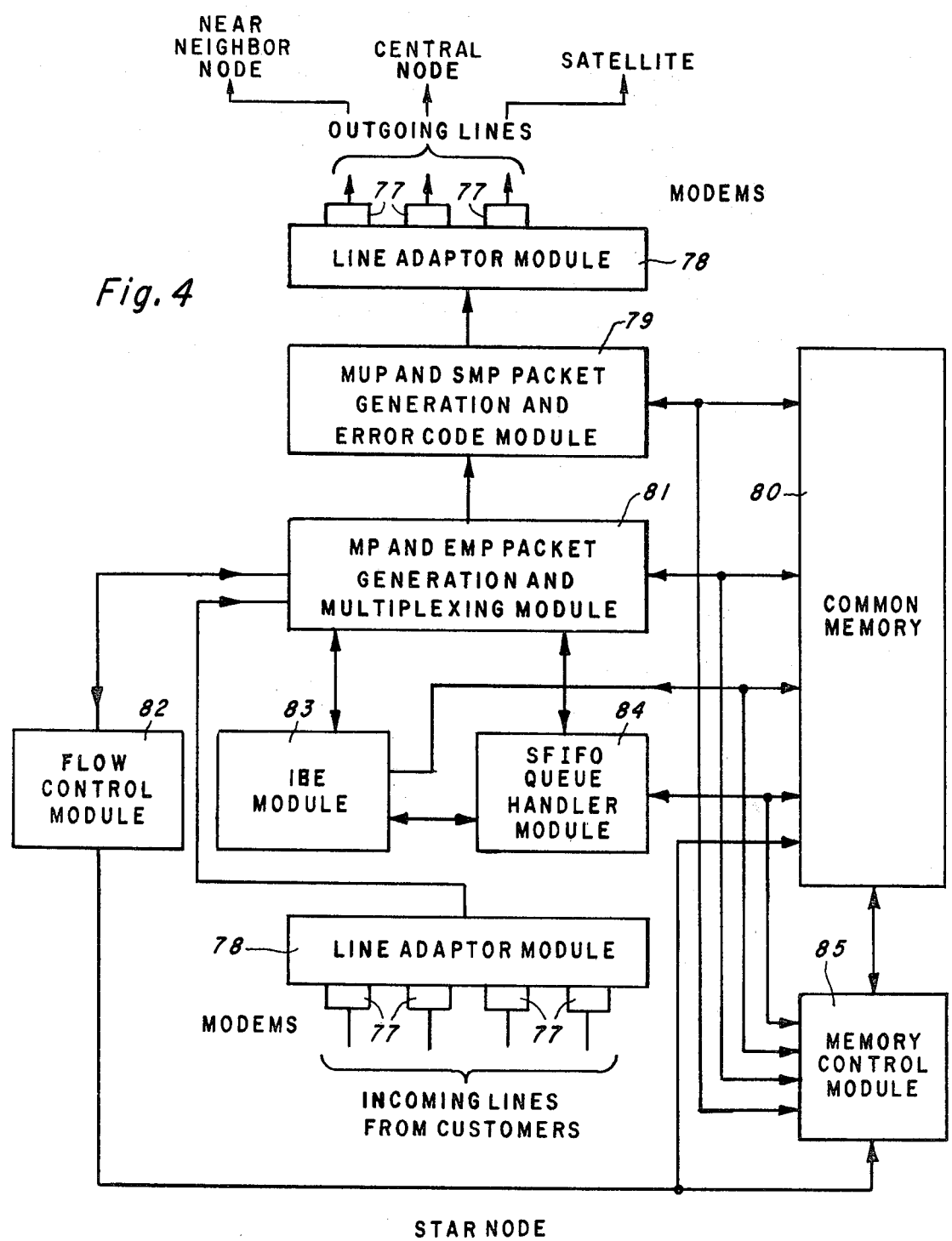
FIG. 4 is a functional block diagram depicting the principal parts of a typical star node when handling traffic in one direction.

Now referring to FIG. 4 in more detail, it will be observed that there are shown input and output modems 77 to which incoming and outgoing lines are connected. These modems are in turn connected to line adaptor modules 78 and 78'. The upper line adaptor 78' is connected to multi-user packet and satellite multi-user packet generation and error coding module 79 which, in turn, is connected with both the common memory 80 and the mini-packet and extension mini-packet generation and multiplexing module 81. As will be observed, module 81 is interconnected with the common memory 80, flow control module 82, instantaneous bandwidth expansion (IBE) module 83 and selective first in/first out (SFIFO) queue handler module 84. Each of the modules 79, 81, 82, 83 and 84 are connected to the common memory 80 which in turn is connected to memory control module 85. In addition, modules 79, 81, 82, 83 and 84 are also connected to memory control module 85.

Figure 5:
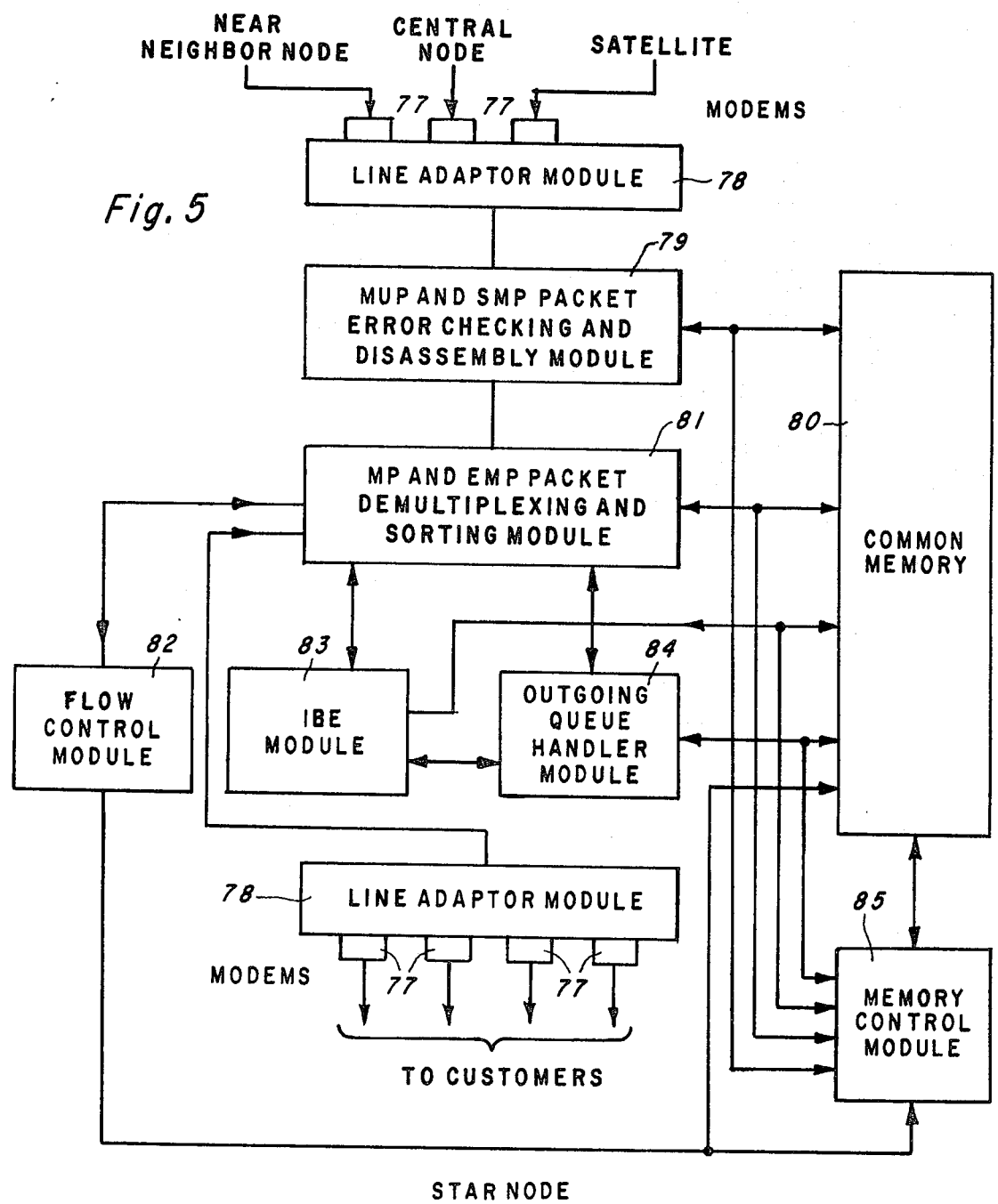
FIG. 5 is a functional block diagram depicting the principal parts of a typical star node when handling traffic in the other direction.

The elements of FIG. 5 are similar to those of FIG. 4 except for modules 79', 81' and 84' which are different in order to accommodate the different direction of flow. In FIG. 5, module 79' is seen to be designated as MUP and SMP packet error checking and disassembly, module 81' is MP and EMP packet demultiplexing and sorting, and module 84' is designated as outgoing queue handler.

A complete understanding of the operation of FIGS. 4 and 5 can best be achieved from an understanding of the descriptions of the factors which are involved in the production of mini-packets (MP's) multi-user packets (MUP's) and their transmission through the network. Accordingly, reference should be made to FIGS. 4 and 5 as description of these factors is given below. However, briefly, incoming lines are serviced in accordance with their speed by MP and EMP packet generation and multiplexing module 81 through module 78 of FIG. 4. There, it is reviewed and if the data is either more or less than that which can be embodied in one MP, the excess is stored in the common memory. At the same time, the memory control module 85 is kept informed by signals conducted thereto over the obvious path. Other information received is handled in a similar manner.

During the next execution cycle of hardware which is many orders of magnitude faster than the line service rate, the mini-packets are formed into an MUP by module 79. The latter also provides appropriate header and other supervisory signals as well as the cyclic redundancy check (CRC16 or CRC24) to complete the MUP, and the MUP is then transferred to the line adaptor module for transmission to the next mode. Operation of the flow control, IBE and SFIFO modules is set forth below.

In FIG. 5, the reverse takes place to that described for FIG. 4. Here, an incoming MUP is checked for errors and disassembled. After disassembly, the mini-packets are transferred to the demultiplexing and sorting module 81', after which the synchronous data is transferred to the output buffer in the common memory 80 for a period of 40 ms whereas the asynchronous data is clocked out to the user lines under the control of modems 77, and queue handler module 84'. In the case of synchronous MUP's, the flow control information is extracted by module 81' and 82 and stored in common memory 80.

Ideally, a data and voice communication system would be fully transparent with respect to both protocol and time. In other words, an ideal system would be characterized by having no delays other than propagation time therethrough and it would appear to equipment connected on the far side as if that equipment were connected directly to the terminals of the input side.

All communications systems have some delays due to propagation time. For example, in situations where satellite links are used and where the satellite is approximately 22,000 miles above the surface of the earth, even electromagnetic signals moving at the speed of light will not arrive at their destination until after the passage of more than 250 milliseconds. However, in contrast with the network described herein, the networks of the prior art have had delays resulting from one or more of the following: entrance delays, i.e., time for receipt of enough customer data to form a packet (depends on customer line speed); intermediate link delay, i.e., time needed to receive and error check a packet within the network; intermediate node delay, i.e., time needed to forward a packet within the network (consists of queueing and processing); and exit delay, i.e., time needed to transmit a packet of customer data to the destination device.

When considering transparency to user protocol, it is desired that effective interconnection of user equipment into the system be independent of the functioning within the user equipment itself; in other words, that the communications system which receives signals from the user equipment transmit them rapidly and faithfully through the system to the exit port. Thus, transparency in protocol is extremely important since it determines how easily a customer can interface to a network. At the host end, this may involve costly and risky changes that must be made to the host operating system and telecommunications access equipment.

Typical existing equipment has the capability to communicate via leased or switched lines with terminals using protocols such as BSC or SDLC. Thus, a leased line facility is transparent in both time and protocol.

One well known existing communication capability is that represented by equipment of the International Business Machines Corporation which is based on full duplex transmission. This is known as SNA. The system protocol to support SNA is distributed over the host (i.e., VTAM), front end (i.e. NCP) and controllers. Interfacing a system to another network protocol standard can be very costly (e.g., converting SNA to conform to X-25 international standard protocol for network access). Accordingly, the objective in protocol transparency is to have an intelligent network for sharing facilities and providing data sequencing as well as error correction, but which requires a user interface as simple as possible, e.g. EIA RS 232-C, ideally accepting only a serial bit stream consisting of users data and protocol. As hereinabove menioned, the communications system herein described achieves these objectives to a high degree. Accordingly, it will be observed that when the herein described approach is taken, interfacing with the network hereof simplifies to international standard RS 232-C, which is designed as an interface between the data terminal and a data set, both at the host computer and the terminal/controller end.

The network hereof can support any host computer or programmable terminal using X-25 protocol since the first level of this new standard is also RS 232-C. Moreover, the network allows any non-programmable terminal to have network access without requiring any interface equipment, and to communicate with its host computer which is programmed to communicate in X-25 only.

The incoming packets entering the network over one of the virtual channels are stored at the entrance node after implementing the HDLC link protocol. These stored packets will be serviced by forming mini-packets at regular intervals according to their delivery speeds. At the destination node, data arriving in the first mini-packet will be transmitted after 40 ms at the same speed behind an X-25 header to the receiving host.

For users operating in a "switched circuit mode" the call set up protocol of X-25 will be used in its entirety.

A non-programmable terminal will be serviced as any other low speed terminal entering the network. As the mini-packets reach the destination node one by one, they will be stored there until a sufficient number of bits are accumulated to form an X-25 packet which is then sent to the host computer over the high speed channel using the HDLC link protocol.

The transparent features of this network eliminate all the interface equipment and associated delays. The X-25 users still may enjoy all the advantages of the network such as transparency in time, flow control, elimination of steady state synchronous queues and freedom from the message reassembly lockups. Moreover, the low variance of message transmission delays will enable the X-25 users to transmit encoded voice mixed with other synchronous data.

The implementation of X-25 in the network system hereof also provides a possible solution to the problem of polling in the network. As will be evident to those skilled in the art, it is expensive for a host computer to perform polling through a shared system using X-25 due to the large overhead associated with the small messages. Because of this, networks of the prior art have been forced to use emulation techniques to accomplish polling and addressing locally. This is very expensive.

An additional attractive feature of the network hereof is that when dealing with non-programmable terminals, X-25 overhead does not go beyond the receiving node. Hence, the transmission efficiency of polling is maintained and the use of emulation techniques which make prior art public networks dependent on the users' telecommunication access methods and protocol is avoided.

It will be helpful to an understanding of the following description to view the transportation of data and protocol within the network as store and forward rhythmic message switching using different multi-user packets over different terrestrial and/or satellite links.

It will be further helpful to an understanding of the system to consider data in several categories. First, data which is representative of voice; second, synchronous digital data representative of information developed by high speed intelligent machines, e.g., computers; and thirdly, asynchronous data developed by equipment which is operated manually, e.g., teletype machines or on-line terminals. As will hereinafter be described, first priority is accorded data representing voice; second priority, other synchronous data; thirdly, asynchronous information.

Basic operation of the system revolves around periodic development at very brief intervals of small packets of information hereinafter called mini-packets (MP's). In the example herein described, such mini-packets are developed every ten milliseconds for synchronous traffic. However, other brief intervals could readily be employed without departing from the principles and scope of the inventive concepts. In this connection, it should be noted that formation of the mini-packets involves extraction of a predetermined number of information bits from input buffers where the bits have been momentarily stored, and consequently, development of the mini-packets is essentially instantaneous. They are then arranged in sequential order into multi-user packets (MUP's) the length of which is corrolated with transmission bandwidth so that the number of bits of information in an MUP is essentially equal to the number that can be transmitted over the transmission links during the five milliseconds time interval. This formation of mini-packets into multi-user packets may be considered generally analogous to the sequential placement of box cars in a freight train but where the location of each car is known to the system by means of destination tables (DT's) and activity fields (AF's) which will be described in more detail hereinafter.

An additional feature of the system includes the provision, where substantial quantities of asynchronous data are to be handled, of MUP's which contain asynchronous data as well as MUP's containing all synchronous data. As mentioned above, data for voice and computer communications generally is of synchronous type; that is, data is exchanged at regular rates of transmission which are time related. However, with asynchronous data no such time relation is present, for asynchronous data may be received at any random time and, therefore, the point in time at which data is received has no particular significance.

In order to handle both synchronous and asynchronous data, provisions are made for alternate development of synchronous MUP's and asynchronous MUP's in sequence. Thus, for example, a synchronous MUP is followed by an asynchronous MUP which in turn is followed by a synchronous MUP and another asynchronous MUP. Consequently, each ten millisecond period will see the formation of one synchronous MUP and one asynchronous MUP, with the understanding that a synchronous MUP can always preempt an asynchronous time slot.

In addition to being used for the transmission of data, MUP's may also be used for the transmission of directory or supervisory information. Thus, for example, it is important to the proper operation of the system that various nodes have a means of recognizing destination and routing for each data-containing MP within each MUP. Destination tables (DT's) are developed for this and other purposes.

Destination tables (DT's) are analogous to telephone directories, as they identify each of the users of the network and the route which their traffic should normally follow. Accordingly, the DT at each node for a particular link will list the following information for its originating and transient traffic:
  Send node
  Send port (1-256)
  Customer line speed, e.g., 600 baud asynchronous
  Traffic priority
  Receive node
  Receive port (1-256).

The foregoing information is represented by sequential digital signals which are encoded in MUP's and transmitted through the network at the inception of operation. Thereafter, they may be changed by subsequent messages. Consequently, while the DT may be thought of in general terms as a telephone directory, it is subject to rapid and frequent change during the course of the day when the system is operating in circuit switched mode.

In further considering the destination tables, it will be helpful to think of them as being divided into groups called activity fields (AF's), which indicate the status of the users in DT's, i.e. active (1) or inactive (0). Also, in the examples herein described, it will be assumed that links between star nodes and central nodes will each have a capacity of 112 kilobits per second and thus will normally service up to 256 terminals or computer ports. For this reason, in the foregoing description of the destination tables, reference is made to send and receive port numbers from 1 to 256.

Figure 6:
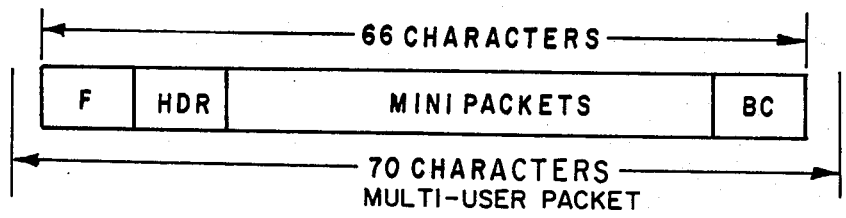
FIG. 6 depicts a typical synchronous multi-user packet.

At star nodes the groups of users identified by Activity Fields one to five (AF1 to AF5) are serviced, by MUP's containing MP's leaving the star nodes for the central nodes, in the following sequence of MUP usage:

FIG. 6 depicts a characteristic multi-user packet which, it will be observed, consists of an initial flag section (F), a HDR (header) section, a mini-packet (MP) section, and an error checking section (BC).

The flag used is an HDLC flag which is a standard international protocol and consists of a zero followed by six 1's and ending with another zero. Its function is to signify the beginning and ending of a multi-user packet.

The HDR or header section normally consists of two characters, the first indicating the packet number (useful when a packet contains an error and must be retransmitted) and the second character being the priority/format (PF) field. This PF field consists of three sections as follows:
  (i) identification (3 bits)
  (ii) service (2 bits)
  (iii) extension (3 bits).

The 3 bit identification field is coded as follows:
000: Synchronous MUP—1st transmission—message switched
001: Synchronous MUP—1st transmission—circuit switched
010: Synchronous MUP—retransmission—message switched
011: Synchronous MUP—retransmission—circuit switched
100: Asynchronous MUP—1st transmission—message switched
101: Asynchronous MUP—1st transmission—circuit switched
110: Satellite MUP transmitted over terrestrial links
111: Satellite MUP transmitted using TDMA
TDMA means Time Division Multiple Access.

The service field is coded as follows:
00: Loop back
01: Escape
10: Trace
11: Normal data packet.

In considering the foregoing, it will be helpful to keep (alternating synchronous and asynchronous)
... 1213121314121312131512131213141213121315121 ...

| *Activity Field | AF2 | AF3 | AF2 | AF3 | AF4 | AF2 | AF3 | AF2 | AF3 | AF5 |
|---|---|---|---|---|---|---|---|---|---|---|
| *Starting at time (ms) | 5 | 15 | 25 | 35 | 45 | 55 | 65 | 75 | 85 | 95 |
| *Packet Number (Mod 256) | 0 | 1 | 2 | 3 | 4 | 5 | 6 | 7 | 8 | 9 |

(*Showing asynchronous only)

| | | Arrival Rates | | | |
|---|---|---|---|---|---|
| Type of Lines | Channel Capacity ch.'s/sec. | Transmission Rates ms/ch. | Arrival Rates ch.'s/100 ms | Arrival Rates *ch.'s/25 ms | Arrival Rates ch.'s/10 ms |
| 110 bd async | 10 | 100 | 1 | | |
| 150 bd async | 15 | 66.66 | 1.5 | | |
| 300 bd async | 30 | 33.33 | 3 | | |
| 600 bd async | 60 | 16.66 | | 1.5 | |
| 1200 bd async | 120 | 8.33 | | 3 | |
| 1800 bd async | 180 | 5.55 | | 4.5 | |
| 1.2 kb/s sync | 150 | 6.66 | | | 1.5 |
| 2.4 kb/s sync | 300 | 3.33 | | | 3 |
| 4.8 kb/s sync | 600 | 1.66 | | | 6 |
| 9.6 kb/s sync | 1200 | 0.83 | | | 12 |

(*On the average).

in mind that normal type of transmission is store and forward message switching and that circuit switching occurs only on retransmission or upon link failure. In the latter case the life span of an MUP is extended to two hops.

The extension field is coded as follows:
000: There is no change in the activity field and minipackets will be immediately following the priority format field.
001: Activate the zeros in the activity field the addresses of which are given following the priority format field. (the addresses are concatenated by 1's and terminated by 0's)
010: Deactivate the 1's in the activity field, the addresses of which are given following the priority format field. (the addresses are concatenated by 1's and terminated by 0's)

011: Replace the received node and received port number of the address in the activity field. (See FIG. 11 in which the address and its modifiers are given following the priority format field as shown therein.)
100: Request (or authorization) for "sign on"
101: Communication for "sign off"
110: Request (or grant) for reservation
111: Instruction to cancel reservation.

The BC, or block checking section, contains bits which are for checking in accordance with the CRC16 standard.

Figure 7:
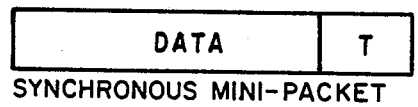
FIG. 7 depicts a typical synchronous mini-packet suitable for employment within the synchronous multi-user packet of FIG. 6.

FIG. 7 depicts the makeup of a typical synchronous mini-packet (MP). It includes from 12 to 96 bits (depending on line speed of the incoming/outgoing lines, and it also includes a trailer section T which comprises 3 bits. These trailer bits are:

| Bits | Meaning |
|------|---------|
| 111 | Not last voice MP, add reservations |
| 110 | Not last voice MP, cancel reservations |
| 010 | Not last voice MP, no reservation information |
| 101 | Not last data MP, add reservations |
| 100 | Not last data MP, cancel reservations |
| 001 | Not last data MP, no reservation information |
| 000 | Last MP, not padded |
| 011 | Last MP, padded by 1 bit or more |

If the last bit in the data section (just before the three trailer bits) is a 1, then the 011 trailer signifies that only one bit is padded. However, if the last bit in the data section is a zero, the 001 trailer signifies that more than one bit is padded. In this event, all the padding bits are zeros except the first which is a one.

Figure 8:
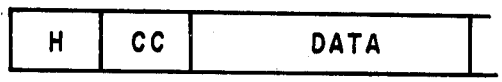
FIG. 8 depicts a typical asynchronous mini-packet suitable for employment within an asynchronous multi-user packet such as that of FIG. 12.

FIG. 8 depicts the makeup of a typical asynchronous mini-packet. It includes a header section H, a character count section CC, and a data section which may contain up to four characters. The coding for these is as follows:

| Item | Bits | Meaning |
|------|------|---------|
| Header | 0 | MPO has no data section |
|  | 1 | MP has a data section |
| Character Counter | 00 | 1 character |
|  | 01 | 2 character |
|  | 10 | 3 character |
|  | 11 | 4 character |

Figure 9:
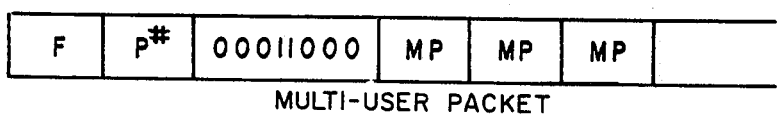
FIG. 9 depicts a typical header portion of a synchronous multi-user packet illustrating a mode indicating no changes in activity fields for a normal synchronous data packet which is transmitted the first time.

Now referring to FIG. 9, it will be observed that it depicts the flag (as described above) an eight digit packet number (1–256) represented by the block symbol P# and the priority format field shown as eight digits. The first three digit positions (shown in FIG. 9 as 000) identify the multi-user packet as being synchronous, message switched and the first transmission. The next two digits (shown in the figure as 11) signify a normal data packet, and the last three digit positions (shown in the figure as 000) indicate that there is no change in the activity field and the mini-packets will immediately follow.

Figure 10:
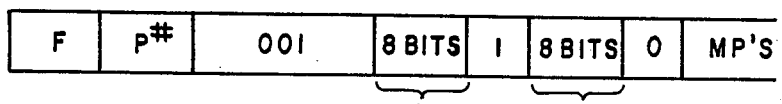
FIG. 10 depicts a typical header portion of a synchronous multi-user packet illustrating a mode for activating activity field addresses.

Another example is shown in FIG. 10 wherein the flag and packet number identifications are similar to those of FIG. 9. However, in FIG. 10, the last three digits of the priority format field (i.e., the extension field) is encoded 001. Reference to the above table will reveal that 001 indicates that there is to be a change in the activity field and that the changes will be given by changing the 0's in the activity field to 1's for the addresses which are given following the priority format field. Thus, the first address given by eight bits (providing for 256 addresses) will be changed from a 0 to a 1, the 0 in the activity field location representing the second address also will be changed to a 1. The 0 immediately following the block designation of the second address indicates that address information for the multi-user packet is now complete and that mini-packets will make up the remainder of the multi-user packet.

If instead of 001 in the immediately preceding example, the digits had been 010, this would have signified that the activity field is to be changed by deactivating the 1's for the addresses which are given immediately following the priority format field. As in the previous example, the addresses are concatenated by 1's and terminated by 0. FIG. 11 depicts the initial portion of a multi-user packet having flags and packet number designations similar to those in FIGS. 9 and 10. However, the last three digits in the priority format field are shown to be 011. Reference to the foregoing table reveals that this signifies instructions to replace the received node and received port numbers of the address in the activity field. The address and its modifiers are given following the priority format field as shown in FIG. 11. The first address consisting of 8 bits is immediately followed by its new node and new port designators. The new node information consists of 5 bits which are capable of identifying any one of 32 nodes while the 8 bits within the new port designator are capable of signifying any one of the aforementioned 256 ports. The 1 immediately following thereafter indicates that there is to be a second new address together with new node and new port designations, and the 0 immediately following thereafter indicates that the new addresses are now completed and that mini-packets are to follow. This technique is used when a user who is normally connected through the network to a particular port wants to operate in "switched circuit" mode. That is, when a user who normally is connected to a particular port wants on a one time basis to change his connection to a different port.

Still considering the coding of the extension field, if instead of the 011 digits shown in FIG. 11, they were 110 or 111, the priority format byte will not be followed by an address but by 8 bits called a quanta (Q) byte in which 5 bits identify the destination node, 2 bits specify the number of quanta, and the third bit is used to concatenate Q bytes by 1's and terminate by 0. Q bytes relate to requests for or verification of reservations for traffic through subsequent links. Other traffic will take precedence over Q bytes and the sending of Q bytes will be performed in the manner hereinbefore described only if there is traffic space to the required destination. If not, then reservation information (e.g. add, cancel, command or request reservations) may be carried in the trailer bits of a mini-packet. Another alternative when there is a need to send more reservation information than may be fit into available transmission capacity for an MUP, is to preempt the next asynchronous MUP and send a packed consisting of the required number of Q bytes.

Initially, the activity field information is transmitted in its entirety. After that, as the various terminals sign on and off, the activity field is modified using the priority format field extension bit system described above. Normally, it will be found that on the average no more than two such address changes are identified in any one multi-user packet, i.e. during a 10 ms period. Hence on the average, 18 bits (2 address bytes+2 extension bits)

are required for AF1 modifications. Hence when using 112 kb/s links in star nets the synchronous MUP overhead is approximately 27%, assuming (on average) that an MUP contains 17 MP's of 3 characters each.

When a new address is introduced, a corresponding mini-packet must be included in the MUP. At the same time, a 0 may be put in the header of the mini-packet which is being discontinued. This is accomplished since system protocol does not allow both activation and deactivation to take place in the same packet. In the next packet appropriate deactivation will occur by including appropriate extension bits following a 010 priority format.

Reference is now made to FIG. 12 which depicts asynchronous multi-user packets (AMUP's). Here, the flag is similar to the flags of the packets hereinbefore described. The first character of the header, i.e. SP#, designates the send packet number which is a number from 1 to 256. The next character which is shown as ACK byte is employed for express acknowledgement or non-acknowledgement of the correct receipt of the previous eight packets.

It consists of 8 bits which individually signify whether the eight most recent packets were correctly received. Thus, for example, in FIG. 13 (which shows a part of FIG. 12 in detail), the first bit in the ACK byte is a 1, the next a zero, and next a 1 and so on until the eighth is a zero. Beginning with the first bit, the one indicates that the packet which is identified by the receive packet number in the RP# byte, has been received correctly. As an example, if that packet is number 79, the next bit, a zero, relates to the next previous MUP. Since a zero indicates that the packet has not been received correctly, the zero in the second position indicates that packet number 78 has not been received correctly. The 1 in the next position indicates that packet number 77 has been received correctly, the next 1 that number 76 has also been received correctly, the next zero that number 76 has not been received correctly and so on through all eight.

The fourth character in the header is the priority format field. Here, the first three bits and the last three bits of the field have the same functions as in the synchronous MUP's. However, the fourth and fifth bits are unique to the asynchronous packets. They identify activity fields as follows:

00=AF2, 01=AF3, 10=AF4, and 11=AF5.

When using 112 kb/s links in star nets the asynchronous MUP overhead is 30%, assuming (on average) that an MUP contains 17 MP's of 3 data characters each.

It will be recalled that an important feature of the system herein described involves the integration of both satellite and terrestrial communications links. Reference again to FIG. 3 will recall the inclusion of "roof top" satellite antennas at the star and central node locations. Before proceeding further with an examination of the importance of these features, it will be helpful to consider that the major part of real time traffic consists of that which is produced by inquiry response terminals. These terminals characteristicly operate at 1200 baud. Moreover, the average message length has been found to be approximately 50 characters in length. Now considering that the propagation delay involved in satellite transmission approximates 250 milliseconds, it will be observed that for any message of the prior art equal to or longer than 36 characters, the amount of time necessary to receive such message over conventional terrestrial links will be equal to or greater than satellite propagation time.

Before a packet could be formed in accordance with the prior art, it was necessary to receive the message. At the rate of 1200 baud, or 6.66 milliseconds per character, the average message length of 50 characters occupies approximately 343 milliseconds. Since there are no such delays within the system herein described, it will be evident that for such messages it will be more rapid to transmit them via satellite than it would for the prior art equipment to transmit such over direct terrestrial links.

An additional feature of the herein described equipment resides in the fact that through satellite communications, each node can be directly connected with every other node. Moreover, this can be done with minimum complexity and without the necessity for the myriad of interconnections which similar direct connection via land lines would require.

Although satellite links could be employed to accomplish all of the interconnection functions of the system, a substantial advantage of the inventions herein contemplate the cooperative association of the satellite links with the terrestrial links whereby increased overall efficiency is achieved. Thus, for example, in order to facilitate retransmission of messages and protocol, substantial savings in time and buffer storage space can be achieved by providing a limited low speed mirror image of the satellite network on the ground whereby satellite multi-user packets may be retransmitted for the purpose of error correction, and limited protocol (such as having 6 characters or less) can be speedily sent. To accomplish this, the terrestrial channels would operate at a speed of 2.4 to 9.6 kilobits per second depending upon the traffic being extended via satellite links.

Another important feature associated with the satellite capability involves local or remote extension capability. Thus, for example, provision is made for the establishment of a direct entry ability into the system from any location which may have a volume of traffic sufficient to require it. The attendant advantage is that in such an instance, a relatively low cost connection via a terrestrial trunk is made from the extension location into the system, and a large volume of traffic may be communicated via the satellite to the location to which the major portion of the high volume bulk traffic is ordinarily directed. In such an instance, it will be evident that substantial economies will accrue, since a relatively inexpensive terrestrial line will link the facility with the network, and the major traffic can readily be handled by the inherently large capacity embodied in the satellite facility. Further, in accordance with this feature, the purpose of the terrestrial link centers around the retransmission of messages for error correction purposes and the transmission of appropriate protocol.

Another advantage associated with the integrated satellite/terrestrial network involves its ability to handle error correction of packets which may have been damaged either in the case of satellites through weakness of transmission or atmospherics or in the case of terrestrial lines through natural or man-made (impulse) noise. In this connection, it will be recalled that in the prior art, packets were often formed entirely of one user's information and consequently any error which may occur within that packet would invalidate it in its entirely. Since such a packet typically consists of a number of characters it will be seen that an entire packet of substantial size would require retransmission. However, it has been found that typically, transmission errors in satellite links result in clustered errors which occur in no more than a very few of the mini-packets within one of the satellite multi-user packets. In such a situation, even if the affected SMUP packet could not be retransmitted within the allotted time (before the output buffers would be emptied), and if as a consequence it were necessary to send out to the user the incorrect mini-packets, the user's own error checking of its own message would reveal this condition and request retransmission of his message through the network. In such instance it has been found that because of the clustered errors, no more than a small number of customers would be involved and consequently the entire system would not be burdened with a request for a large number of message retransmissions. These and other features of the integrated terrestrial satellite system will be evident from reference to FIGS. 14 and 15 which respectively depict the integrated terrestrial and satellite subnets and the satellite extension node.

Now referring to FIGS. 16 and 17, it is observed that they depict timing relationships between the star nodes and the central nodes. This may be of particular interest in considering the error correction and checking features of the system in greater detail. It will be recalled from the foregoing description that certain of the information which is transmitted within multi-user packets relates to the error correcting and retransmission features. Error correction is based on the retransmission of the multi-user packets between adjacent nodes using an implicit ACK and explicit NAK scheme. In order to maintain the continuous flow of synchronous data and still allow for 3 to 4 retransmissions of incorrectly received multi-user packets, an output buffer large enough to hold 4 mini-packets is used at each output port. If during the 40 millisecond delay caused by the output buffer, the defective multi-user packet cannot be correctly received, it is then transmitted forward because the errors are usually confined to no more than 1 or 2 mini-packets (customers). A NAK is sent via an HDLC abort character, which preempts the ongoing asynchronous multi-user packet and inserts in the remaining time slot a null packet. The NAK is received by the transmitting node before its next synchronous transmission and so it retransmits.

If retransmission is required, then on a central link the multi-user packet is retransmitted in double redundancy, while on a star link one copy of the multi-user packet is retransmitted via the alternate (near neighbour) path in a circuit switched mode and two copies are retransmitted to the central node via the original link. If none of the three retransmissions is error free, the same retransmission scheme is tried once more. The priority format field of the multi-user packet header indicates mode of retransmission.

In regard to the asynchronous multi-user packets, error correction is based on retransmission of the multi-user packet. An explicit ACK/explicit NAK is used, because the continuity of data transmission is not so critical for asynchronous multi-user packets. Error retransmission is initiated by the multi-user packet header, and retransmission occurs in an asynchronous time slot.

As mentioned above, features of the network are very attractive for the transmission of encoded voice in synchronous MUP's together with other data. This is characterized by:

(1) minimal entrance delay (10–20 milliseconds at 2.4 kb/s
(2) low average message delay (70 milliseconds)
(3) low average undetected error rate ($10^{-12}$ errors/bit)
(4) low variance of message transmission delay.

The minimization of entrance delay is of great concern for encoded voice transmission. In the network herein described, the entrance delay for a 24 bit mini-packet from a 2.4 kb/s encoded voice terminal is 10–20 milliseconds. This small delay may be contrasted with that of a non-transparent network such as ARPANET. In such case, direct access to the network via a TIP involves either the formation of 1000 bit packets with corresponding entrance delays of over 400 milliseconds for 2.4 kb/s terminals or many smaller packets with very high overhead. The latter approach reduces the packet formation time but significantly increases the variance of message transmission delay and packet sequencing problems. The high error rate and high delay variance are particularly damaging to the encoded voice transmission because they result in loss of frame synchronization when statistical multiplexing is employed.

In general, for a synchronous terminal directly interfacing with a packet switched network, the formatting should be such that the network can identify the useful information (i.e., busy and idle periods). In the case of existing synchronous data terminals with their link protocols, these requirements generally are satisfied. However, the same is not generally true for voice terminals according to the prior art.

In accordance with a feature of this invention, a method of formatting encoded voice is produced which permits direct interfacing with the network hereof by providing a means for identifying active and idle periods. If the active periods are delineated with HDLC flags, then the leading and trailing flags indicate the start and end of a block of encoded voice, respectively. HDLC bit insertion is employed to prevent the imitation of flags by the encoded voice data. This accommodates blocks of variable length, another feature which is important for encoded voice. In this connection, it is helpful to have in mind that the average duration of a monosyllabic word and of a talk spurt are about ¼ and 1 second, which at 2.4 kb/s represent block lengths of 600 and 2400 bits, respectively.

Normally, this protocol will be implemented in hardware such as a microprocessor as part of the speech processing equipment. The implementation is made possible by using the spectrum amplitude information present in each frame of the channel vocoder output.

Suitable vocoders are exemplified by VADAC II and VACAD V speech processors and linear predictive coders. Frame structure for 2.4 kb/s (snchronous) operation is shown in FIG. 18 where it will be observed that frame output of a VADAC V speech processor consists of 54 bits which are distributed as follows. First, there are 6 bits representative of pitch control. These are followed by 1 bit for frame synchronization, and thereafter follow the remaining 47 bits which are spectrum descriptors.

When the vocoder is idle, all spectrum descriptor bits are low, whereas when the vocoder is active, some of the spectrum descriptor bits are high. Implementation consists of receive (from VADAC) and transmit (to VADAC) functions.

The receive module performs initial framing and continuous frame checking of the incoming 54 bit frames. Because of byte oriented synchronous line adaptors (e.g. Digital Equipment Corporation DU11 serial interfaces may be used to interface the VADAC's to the hereinbefore mentioned PDP 11's) and the byte oriented buffering routines hereof, incoming frames are stored four at a time (27 bytes) to facilite byte-by-byte processing.

While an initial sequence of frames is immediately transmitted to enable the VADAC receiver to acquire initial frame synchronization, this is accomplished to avoid having the receiver synchronize on the first active frame sequence.

Active and idle frames are identified one at a time with no speech clipping and one frame delay (22.5 milliseconds). An alternative approach based on predicting the state (active or idle) of the next frame based on the state of the present one would require no delay but would result in as much as one frame of speech clipping at the start of speech messages.

A hangover is provided at the end of each active frame sequence to ensure that the speech message has ended; i.e., stop consonants in speech are preceded by short pauses (idle periods) that occur in the midst of words and phrases. The hangover extends active periods in speech to absorb short pauses and thereby form longer continuous speech messages. This hangover may be variable or fixed depending upon the statistical properties of stop consonants and the flow control used within the herein described network.

The transmit module performs the following functions. First, the initial frame sequence received is output to the VADAC receiver and is followed immediately by locally stored idle frames in order to establish and sustain initial frame synchronization in the VADAC receiver. Outgoing idle frames are flagged and frames of newly arrived messages are identified. Because of the 54 bit vocoder frames and the byte oriented equipment previously described, the first frame pulse in speech messages is not always located in the first bit position of the first byte, but rather in one of four possible positions. Therefore, a few frames (e.g. 5 or 6) are examined at the start of each message to identify which of the four possible frame sequences is being received. This involves a delay which is absorbed in the network output buffering used for synchronous error control.

Once newly arrived active frames are identified and outgoing idle frames are flagged, the first of the active frames in each message is meshed with the last of the idle frames in order to maintain VADAC receiver frame synchronization. Meshing is required because of variable network delays which cause the active messages to arrive at randon times with respect to the locally generated idle frames. Therefore, active frames are buffered until the present idle frame has been output. Normally, a variable meshing delay due to this buffering, of from 0 to 1 frame is incurred. In accordance with the present invention, byte-by-byte processing results in meshing delays of from only 0 to 4 frames (90 milliseconds); however, these delays which are largely absorbed in the buffering delay for error control mentioned earlier, and may be reduced to 1 frame maximum through additional processing.

Messages in the network may be classified as type 1, 2, 4, or 8, corresponding to the number of servers required, which in turn depends on user line speed, e.g., 1.2 kb/s messages require one server and 9.6 kb/s messages require eight servers.

The terms "bulk" and "job" are used interchangeably, and the term "bulk unit" is introduced.

A "bulk unit" corresponds to 1.2 kb/s, and hence a message of type i consists of i bulk units.

In considering delays in the network, it may be assumed that there is an infinite job population, with type 1, 2, 4 and 8 messages and bulk Poisson arrivals, where the bulk size at each arrival instant is random.

As will be recognized by those skilled in the art, a network entrance node is similar to an M/M/m system, where each of the m servers has 1.2 kb/s channel capacity. The non-homogenity of the message population causes less than optimal server utilization.

In network entrance nodes, an incoming message is either serviced as it arrives (if sufficient servers are available) or is queued. The network does not service a second message from a terminal while the previous message from that terminal is still in service.

If, for example, messages arrive in the following order: type 1, 4, 1, 2, 1, 8, 1, 2, 2, 4, if m=number of servers=15; and if a strictly FIFO (first-in, first-out) sequence is used, then one MP from each of the first five messages will be packed into an MUP for transmission, leaving five messages queued and 6 out of 15 servers idle. This is clearly not an effective way to reduce admission delays, and so in the network of this invention an SFIFO (selective FIFO) sequence is employed to minimize the number of idle servers. In SFIFO, one MP from each of the first 5 messages is packed into the MUP for transmission (as in FIFO), the type 8 message would be queued (first on queue), one MP from each of the next 4 messages would also be packed into the MUP, and the type 4 message would be queued (second on queue). Hence 2 messages would be queued, with priority for admission to the next MUP (assuming sufficient servers are available) and only 1 out of 15 servers would be idle.

In accordance with another important feature of the invention, instantaneous bandwidth expansion (IBE) is provided in the network to utilize idle servers to expand the service rate on messages which either experienced admission delay or arrived over a high speed line in batch form. When the IBE technique is not being used, a network entrance node corresponds to an M/M/m system. Each time an MUP is formed, the multiple-server system packs the MUP according to an SFIFO discipline. Then, if idle servers remain, IBE will utilize them, but in such a fashion as to remain invisible to the multiple-server system. Hence, IBE provides expanded message service but does not alter either the arrival statistics or the average number of servers used by the multiple-server system, it remains $m \cdot \rho$ where $\rho$=utilization factor and m=number of servers.

IBE may be preempted (by new arrivals) or resumed (if idle servers and candidates for IBE exist) at each MUP formation time.

The expanded message service provided by IBE shortens the average message length seen by the multiple-server system, and thus shortens message service time (since message service time depends to a great extent on message length at low transmission rates such as 1.2 kb/s or 6.66 characters/ms). With IBE, servers are freed sooner than with no IBE, thereby increasing the time transparency of the system by reducing admission delays. IBE does not affect the arrival statistics of messages, which are under user control and assumed to be Poisson. But, by shortening the average message length through the use of different channel capacities every 10 ms, IBE convolves a number of different service rates such that an M/M/m system without IBE changes to an M/G/m system. This means that the average message lengths seen by the multiple server system are now shorter and less random ($C_b<1$), that is, the coefficient of variation $C_b$ is less than one. However, the multiple-server system is not aware of the existence of operation of IBE and thinks that these shorter messages with less random distribution were generated by the user.

IBE causes messages to be transmitted to the destination node faster than they can be output, thereby building a queue at the output node, which permits more retransmissions for error correction than the few that are possible with the standard 4 MP output buffer.

Messages which are eligible for IBE have idle servers allocated to them on a FIFO basis. Each allocation represents 12 bits or one quanta of bandwidth. The portion of the MUP (or the MP in the case of type 1 messages), which receives IBE is formed into an extension mini-packet (EMP) consisting of 12 data bits and 1 trailer bit (including whether or not another EMP follows), and is packed into the MUP following the MP for this message (see FIG. 20).

The protocol embedded in the MP trailer bits indicates whether or not IBE is occurring for this message.

FIFO method for allocation of IBE servers is as follows:

Idle servers, providing they cannot be used by any message in the SFIFO, are allocated to the first message in the FIFO queue (one server for each 12 bits) until either idle servers or first message are exhausted. If idle servers remain, they are allocated to the second message, until it is exhausted, etc. This allocation with regard to new arrivals and SFIFO is reviewed every 10 ms.

Not all messages which are candidates for IBE will receive IBE. Some may escape via normal servicing before IBE can be applied to them. Hence the use of IBE creates more than one type of message population, and so the availability of a server depends on what type of message is being serviced (queued or not queued, expanded by IBE or escaped). Thus the distribution of admission delays is hyperexponential ($C_b>1$).

The foregoing description of IBE is, by way of example, for single-hop traffic where there is not a need for reservations. Where multiple hop traffic is involved, allocation of idle servers for IBE will occur first for messages needing no reservations (single hop), second for messages requiring and holding extra reservations, and last for messages requiring but not holding additional reservations. In other words messages which are undergoing IBE require more reservations and use them for shorter periods of time since the message lengths are compressed as a result of using IBE.

Unlike a conventional packet switched network of the prior art, the packets hereof are transmitted and switched in parallel. In other words each customer uses a small fraction of a given link capacity, i.e., one of its channels. Because of this, flow control is called "channel flow control" (CFC).

The motivations for CFC are to:
(i) control congestion in every branch of the network using a global reservation scheme
(ii) eliminate the synchronous queues at all nodes for the transient traffic;
(iii) reduce the end-to-end message delay variance so that encoded voice can be transmitted mixed with data
(iv) enable the network to operate with deeply saturated links for long periods of time
(v) force the queues at the intermediate nodes to approache a D/D/1 system representing a completely ordered flow
(vi) prevent the loss of reservations when a node failure takes place
(vii) minimize the admission delays at the entrance nodes by controlling and managing the flow of reservations according to the current traffic requirements.

Various conventional flow control schemes of the prior art can neither provide a global control nor do they allow the branches of the network to operate in a deeply saturated state. Moreover they fail to provide low enough end-to-end message delay variance so as to enable the network to transmit encoded voice together with data.

The purpose of channel flow control is to avoid congestion in every link of the network due to short term traffic peaks and in doing so provide optimum transit times while allowing maximum channel utilization. In the embodiments herein described flow control applies only to the synchronous traffic. Moreover, the synchronous traffic always has priority over asynchronous traffic since the asynchronous user can tolerate reasonable interruptions.

The flow control hereof is based on entities called "reservations". A particular reservation is a quantum which corresponds to 12 bits in a synchronous MP travelling in on a particular channel into an exit node (i.e the last hop). The reservations are required when an MP travels two or three links to reach the destination node. When a reservation quantum for a star link is passed from one central node to another node, it also reserves bandwidth on the central link.

Thus an incoming synchronous message must wait for sufficient reservation quanta on the last link to be travelled and then must wait for available space in an MUP travelling on the first link, in order to transmit the first MP. To reduce this admission delay for the transmission of synchronous data, asynchronous MUP's can be preempted by the synchronous MUP's.

The operation of the CFC can be explained in a very simplified manner by the following queueing model of the airline passengers: Consider that each node of the star net shown in FIG. 1 is an airport. Also consider that airplanes (MUP's) of different sizes (channel capacities) carrying passengers (MP's) are leaving the star nodes at fixed time intervals (10 ms) and arriving at the central node at the same time. At the central node some of the passengers reach their final destination while the others catch their connecting flights. CFC forces the queues in the central node from D/M/1 towards D/D/1 by simply preventing the passengers from starting their journeys without obtaining reservations for their connecting flights.

The existence of queueing systems approximating D/D/1 at the central nodes implies that the links of the network can operate using their full capacity, i.e. deeply saturated, for indefinite periods of time provided that the average number of packets entering the network per second and destined for a particular node is equal to the average message length times the channel capacity of the saturated link connecting this destination node to the nearest central node of the star net.

This is a very definite advantage of the channel flow control and it goes well above and beyond just providing congestion control.

In a conventional packet switched network, packets are transmitted over high speed lines in series. Because of the inherent limitations of an M/M/1 queueing system it is not advisable to operate with the values of $\rho$ higher than 0.7 or 0.8 in a K connected network, if one wishes to maintain low overflow probability and small buffer sizes. In addition there are queues in every node of the network. These vary in size and produce variable delays.

When two or more packets belonging to a particular message are sent to their destination node using different routes, they experience different delays and usually get out of sequence. This end-to-end message delay variance makes it very difficult to transmit encoded voice and data in the same network.

If customer packets are transmitted over the same high speed lines in parallel, i.e., each customer occupying a small fraction of the bandwidth, not only will large savings be achieved in storage costs, but also, idle periods will occur in parallel. This simple means that using "instantaneous bandwidth expansion" (IBE) it is possible to achieve transmission efficiency beyond what is possible with statistical multiplexing. Further improvements in transmission efficiency and in end-to-end message delay variance are possible if the high speed links are divided into 1.2 kb/s channels and each channel is controlled by a reservation procedure. Such a procedure is used in the network and is called channel flow control (CFC). The best implementation of CFC is when using an architecture which consists of a number of star nets. The central nodes can then control and manage the flow of reservations while star nets achieve the minimum transit delays by concentrating the traffic. The central nodes can then be fully connected to each other using both the terrestrial links and 12-14 GHz satellite channels. At one end of the design spectrum one has the choice of selecting these terrestrial links to be large enough to carry all the real time traffic. While at the other end of the spectrum one can transmit both bulk and real time data over satellite channels using "roof top antennas", and selecting the terrestrial link channel capacities to be as low as 9.6 kb/s. In this case the terrestrial network is only used to transmit the protocol messages and the retransmission of satellite packets.

The proposed "Channel Flow Control", (CFC) minimizes average synchronous message delays in a star net for the full range of $\rho$ by reducing, if not completely eliminating the queues. In other words CFC will force a D/M/1 system to approach D/D/1, thereby representing a completely ordered flow.

The existence of queueing systems approximating D/D/1 at the central nodes makes it possible for the system to operate with fully saturated branches i.e., with maximum link efficiency, for long periods of time if the channel capacities of these branches are determined by careful traffic engineering so that the average value of the number of packets entering the network per second to reach a particular node does not exceed the mean message length times the channel capacity of the branch between the destination node mentioned above and the nearest central node of a star net.

Figure 19:
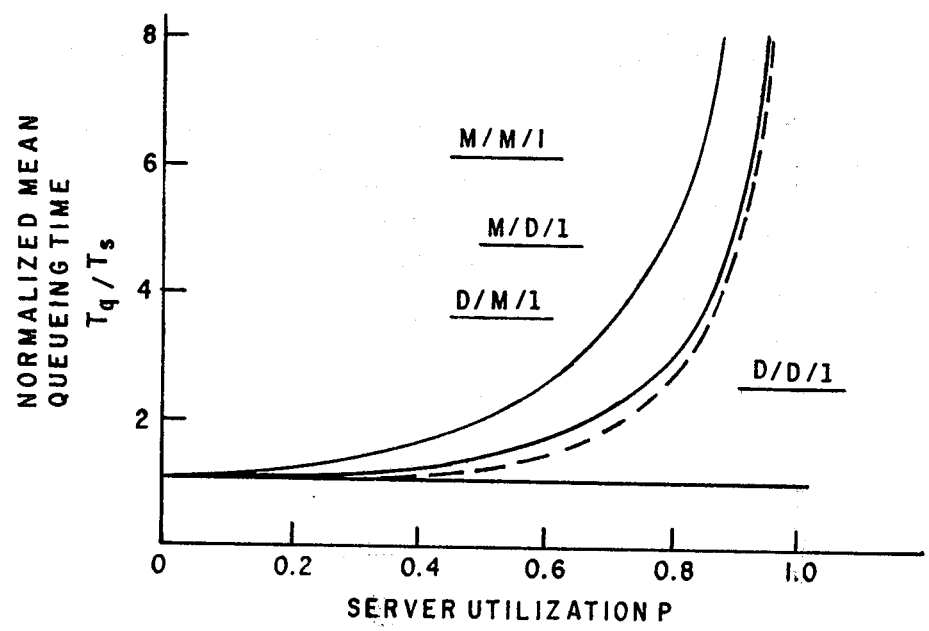
FIG. 19 is a diagram providing a comparison of normalized mean queueing times.

The network model given in FIG. 19 shows that the queues can form either at the entrance or central nodes. First consider the queues at the central nodes. Here, multi-user packets arrive at 5 ms intervals and get serviced. The term servicing entails the following: error checking, sorting out the MP's according to their destination and priorities, forming new multi-user packets and transmitting them at 5 ms intervals. If there are more MP's than can be accommodated in a 66 character packet (2 frames) destined for a particular channel, a queue will start building up at the entrance to that channel.

Clearly the queueing system for each destination is one of deterministic bulk arrivals, bulk service, and a single server. It can be shown that the system $M/E_r/1$, in which each customer had to pass through r stages of service to complete his total service, is identical to an M/M/1 system with bulk arrivals of exactly r customers who require only a single stage of service. Similarly, the system $E_r/M/1$, in which arrivals taken from an infinite pool of available customers were considered to have passed through r stages of "arrival", is identical to an M/M/1 system which provides service to groups or exactly r customers.

In the example under discussion, the arrivals of multi-user packets at the central node are not exactly synchronous because the propagation delay at each channel is different. However, the assumption of deterministic bulk arrivals is a good approximation. With this assumption the queueing system can be represented by $D/E_r/1$. Now the queueing time for the $D/E_r/1$ system falls in the range between D/M/1 and D/D/1 shown in FIG. 19. As can be seen, constant service M/D/1 and constant arrivals D/M/1 both are about equally effective in improving the queue operation, e.g. M/D/1 has half the average waiting time as the M/M/1 system. Also, for large values of line utilization, M/D/1 queue size approaches 50% of the M/M/1 queue.

On the other hand, in D/D/1 system with regular inputs and constant service, no queueing can take place. Hence it can be operated up to the maximum utilization $\rho = 1$ with no degradation.

The CFC method can be stated briefly as follows. A synchronous message to be transported in MP's from a node i to node j, with $\bar{n} \geq 2$, must reserve a bandwidth equal to its incoming channel capacity on the link between node j and j's central node before it can be allowed to enter the network.

For messages to be transported between two adjacent nodes, i.e., $\bar{n} = 1$, no reservations are necessary. The bandwidth of each channel of the star net will be dynamically allocated to carry:

(a) Multi-user Packet and MP overhead.
(b) Adjacent node traffic ($\bar{n} = 1$).
(c) Transient traffic ($\bar{n} \geq 2$).

The assignments of bandwidth to traffic will be done in quantums of 1.2 kb/s, i.e., in 6 bits of 280 bits Data Route frame. Since synchronous multi-user packets are formed every 10 ms, twice as many bits, i.e., 12 bits, will be required for a 1.2 kb/s line. Similarly, 2 quantums of bandwidth or 24 bits every 10 ms are necessary to support a 2.4 kb/s line.

Although the size of a quantum is fixed at 12 bits, there is a specific quantum for a specific channel of the star net and they are not interchangeable. The central node controls the movement of the quantums of reservations to each of its nodes and treats the other central nodes in a similar fashion.

Channel capacity of each network link is calculated to meet the peak traffic requirement of the estimated user load. Long-term utilization of channels in the network is controlled by restrictions on user sign-ons. That is, if a user requests sign-on and has traffic to an exit node for which one of the channels along the way is already utilized beyond the peak traffic limit in the long-term sense, the sign-on request is held on a "camp-on" queue until enough long-term network capacity becomes available (due to sign-off of other users). However in a properly traffic engineered network the probability of going on a "camp on" queue is very rare indeed.

If the available reservations for a given branch of the network is made equal to the channel capacity of this branch then there can be no synchronous queues. However, this is not very satisfactory from the point of admission delays. When the system is lightly loaded it is desirable to have plenty of reservations at the star nodes. This avoids time delays to request reservations from the central nodes. The channel capacity is therefore, overbooked as much as 100% and the transient queues at the central nodes are scanned at regular intervals, e.g., every 50 ms. If the queue size in front of any branch reaches a predetermined threshold level, then the reservations for this branch are cancelled throughout the network by this particular central node. When the queue clears up, the reservations are once again supplied to the star nodes, and the system operation goes back to normal.

Reservation information is conveyed by all synchronous MP's travelling from a central node to an exit star node, except for the last MP in each message. Hence, for flow control purposes, last MP's are interrupted as carrying no reservation information. This is consistent with the intention of allowing reservations to remain with the entrance node, to be used by subsequent messages or to be cancelled later.

Since the central node does all the bookkeeping, if some of the reservations get trapped in a node and cannot be immediately cancelled because of lack of suitable MP's, then the central node cancels them using the extension code 11 of the P/F byte followed up by the Q byte. If a node fails, the central node immediately transfers its reservations to other nodes. This is strictly a bookkeeping operation.

Clearly, star net is an ideal network topology for the CFC method. Fully connected central nodes extend the control across the network. With a maximum propogation delay of 15 ms, the management of reservations is quite practical for the system architecture.

The foregoing examples describe the inventions in a system employing commercial equipment hereinabove identified, said equipment being generally of the high speed byte-oriented type. However, it will be evident to one skilled in the art that other suitable equipment may readily be employed. Thus, for example, alternate constructions for the modules depicted in FIGS. 4 and 5 will be evident from the foregoing descriptions.

The terms and expressions herein are used as terms of description and not of limitation and there is no intent in the use thereof to exclude equivalents but on the contrary to include all equivalents, modifications and adaptations thereof that fall within the spirit and scope of the invention.

What is claimed is:

1. A communications network having a plurality of peripheral and central communications nodes, a first plurality of terrestrial communications links connecting said central nodes directly to each other, a second plurality of terrestrial communications links individually connecting said peripheral nodes to said central nodes, means for connecting a plurality of customers to each peripheral node, certain of said means being effective to input data at a first given speed and certain others for inputting data at a different speed, developing means at each of said nodes for successively developing at a first repetition rate multi-user packets each containing data from at least two of said plurality of customers connected to that node, said developing means including means effective in a first mode for sampling data input from said customers at intervals directly related to their output speeds at the exit node and, when in another mode, effective upon the existence of available channel space, at speeds higher than said output speeds at the exit node, and means connected to said peripheral node for conducting said multi-user packets to other nodes within said network.

2. A communications network according to claim 1 in which terrestrial links are further included to link said peripheral nodes in near-neighbour pairs.

3. A communications network according to claim 1 further including a satellite, in which said central nodes are further interconnected directly, each to the other, through said satellite.

4. A communications network according to claim 1, further including a satellite in which terrestrial links are included to link said peripheral nodes in near-neighbour pairs and in which said central nodes are further interconnected directly, each to the other, through said satellite.

5. A communications network according to claim 4, in which at least one of said peripheral nodes is interconnected with said satellite and connected to one central node through a terrestrial link.

6. A communications network according to claim 1, wherein each input node further comprises means effective to produce a plurality of differing electrical signals severally representing destination tables.

7. A communications network according to claim 1 wherein each input node further comprises means effective to produce a plurality of differing electrical signals severally representing activity fields.

8. A communications network according to claim 5 wherein each input node further comprises means effective to produce a plurality of differing electrical signals severally representing activity fields.

9. A communications network according to claim 8 wherein each input node further comprises means effective to produce another plurality of differing electrical signals severally representing destination tables.

10. A communications network according to claim 9 wherein said differing electrical signals representing said activity fields are further effective to cause said developing means to sample said data input from said customers at said intervals directly related to said output speeds of said data at the exit node from said customers.

11. A communications network according to claim 9 wherein said nodes further comprise means for transmitting said differing electrical signals representing said activity fields to successive nodes and to cause said nodes to disassemble multi-user packets received thereat, to reassemble new multi-user packets thereat for further transmission to any succeeding node, and to exit from said node any received multi-user packet minipacket destined for a customer connected directly to that node.

12. A communication network according to claim 9 wherein said nodes further comprise means responsive to electrical signals severally representing destination tables when received at network nodes to condition said nodes to conduct subsequent customer message information received at said nodes over predetermined paths to predetermined exit ports.

13. A communication network according to claim 9 wherein said nodes further comprise means responsive to differing electrical signals severally representing activity fields to selectively make predetermined changes in said destination tables.

14. A communication network according to claim 12 wherein said nodes further comprise means responsive to differing electrical signals severally representing activity fields to selectively make predetermined changes in said destination tables.

* * * * *